United States Patent
Kim et al.

(10) Patent No.: US 7,391,632 B2
(45) Date of Patent: Jun. 24, 2008

(54) APPARATUS OF SELECTIVELY PERFORMING FAST HADAMARD TRANSFORM AND FAST FOURIER TRANSFORM, AND CCK MODULATION AND DEMODULATION APPARATUS USING THE SAME

(75) Inventors: Tae-Joon Kim, Daejeon (KR); Ik-Soo Eo, Daejeon (KR); Kyung-Soo Kim, Daejeon (KR); Hee-Bum Jung, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 314 days.

(21) Appl. No.: 11/273,727

(22) Filed: Nov. 14, 2005

(65) Prior Publication Data

US 2006/0129621 A1    Jun. 15, 2006

(30) Foreign Application Priority Data

Dec. 14, 2004    (KR) ...................... 10-2004-0105824

(51) Int. Cl.
    *G11C 19/08* (2006.01)
(52) U.S. Cl. ...................... 365/20; 365/230.02; 365/235; 365/241; 708/404; 708/409; 364/726; 364/759

(58) Field of Classification Search .................. 365/20, 365/230.02, 235, 241, 759; 364/726; 708/404, 708/409

See application file for complete search history.

(56) References Cited

U.S. PATENT DOCUMENTS

| 5,091,875 | A | * | 2/1992 | Wong et al. ................. 708/404 |
| 6,625,630 | B1 | * | 9/2003 | Vinitzky ..................... 708/404 |
| 2003/0152164 | A1 | | 8/2003 | George |

FOREIGN PATENT DOCUMENTS

KR    1020020039255 A    5/2002

OTHER PUBLICATIONS

A Computationally Efficient Algorithm for Code Decision in CCK Based High Data Rate Wireless Communications, pp. 143-146.

* cited by examiner

*Primary Examiner*—Pho M. Luu
(74) *Attorney, Agent, or Firm*—Blakely Sokoloff Taylor & Zafman

(57) ABSTRACT

A Fast Fourier Transform (FFT) apparatus for selectively performing Fast Hadamard transform (FHT), and a complementary code keying (CCK) modulation/demodulation apparatus using the same. An OFDM module and CCK module are integrated as one module having lower complexity compared to conventional scheme by embodying the CCK modulation using FFT structure in the OFDM module, and embodying the suboptimal and the optimized CCK modulations using FFT structure in OFDM module. CDMA, OFDM, CCK modules may be integrated as single module.

18 Claims, 15 Drawing Sheets

FIG. 10
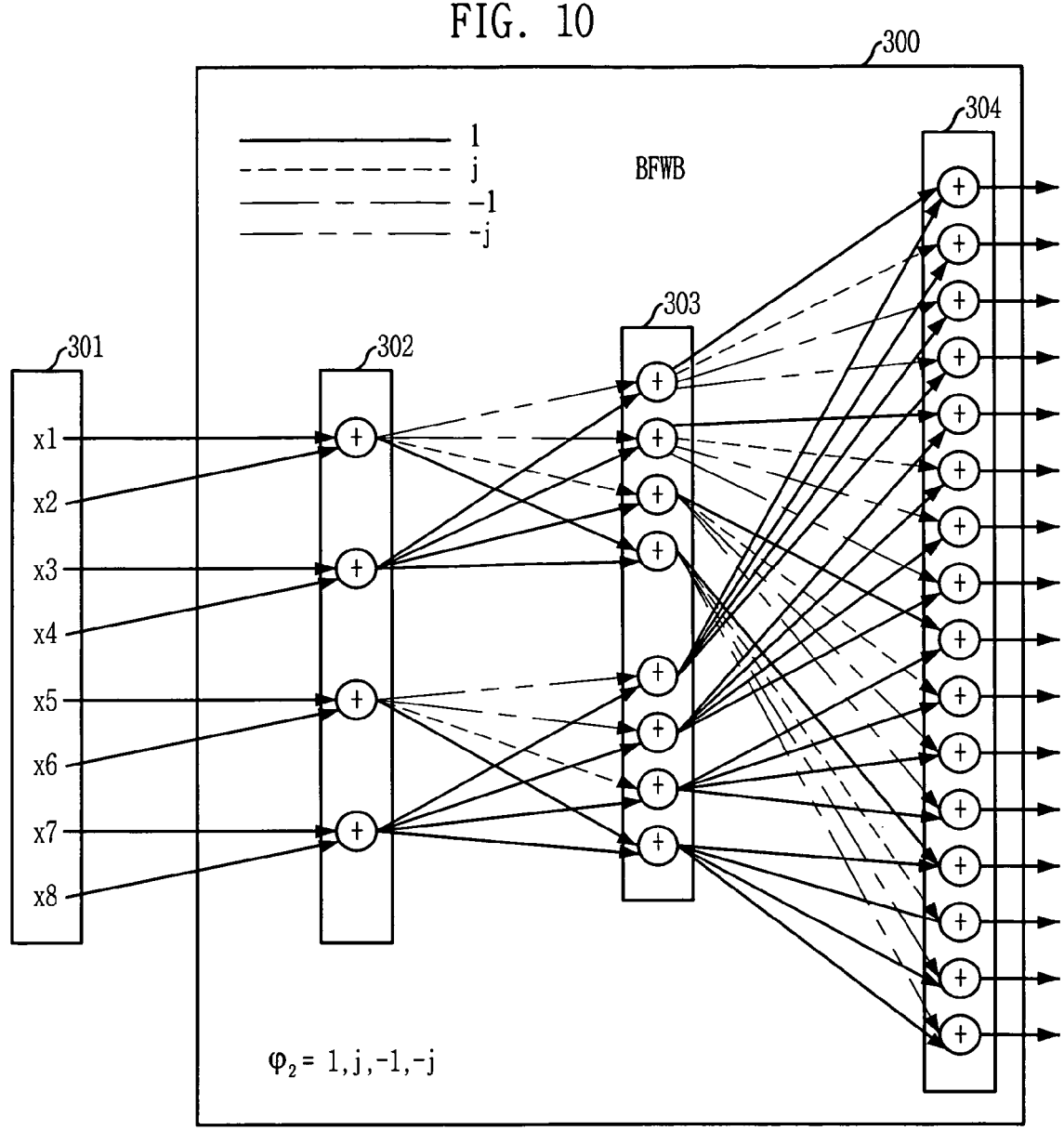
$\varphi_2 = 1, j, -1, -j$
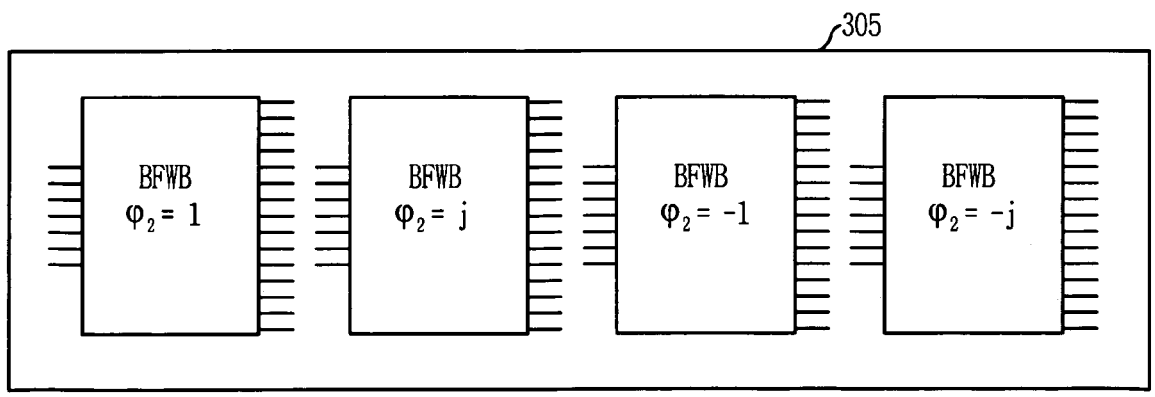

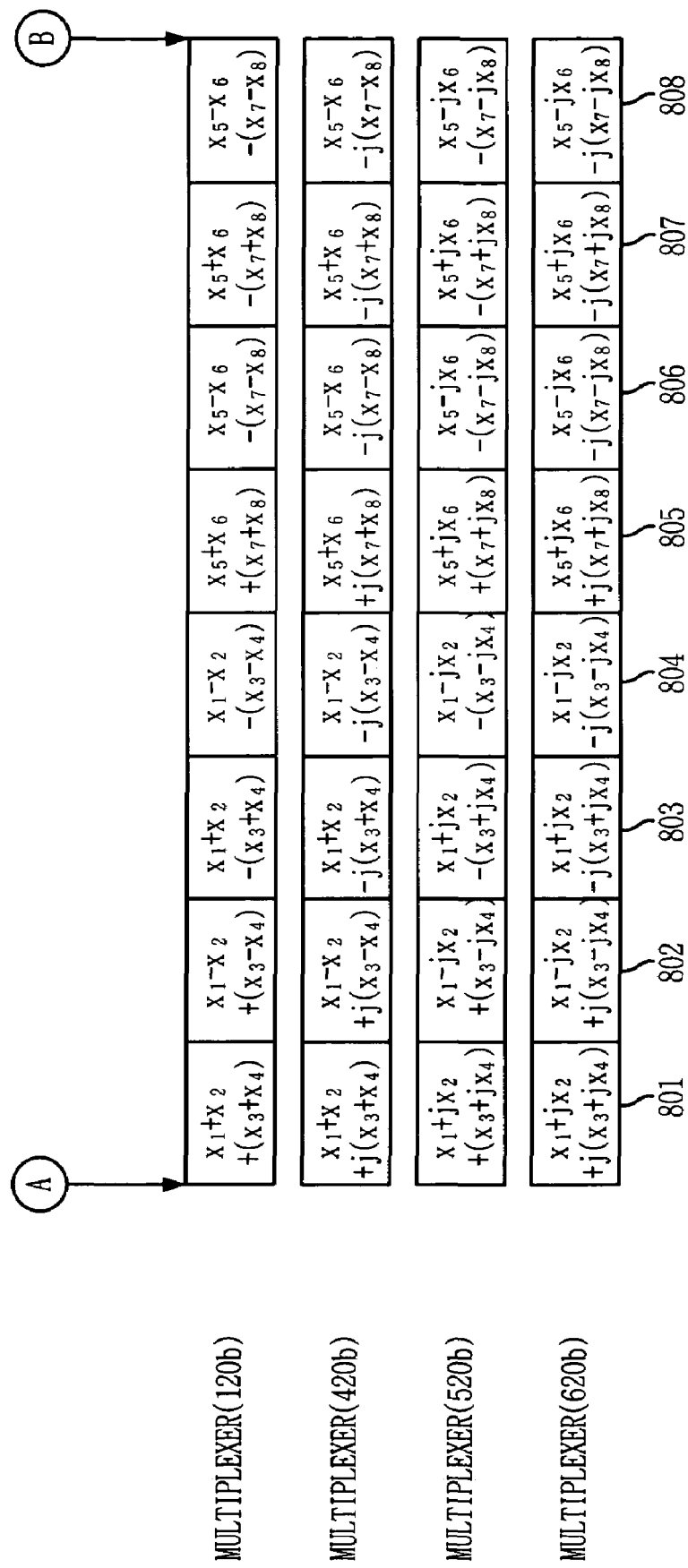

US 7,391,632 B2

APPARATUS OF SELECTIVELY PERFORMING FAST HADAMARD TRANSFORM AND FAST FOURIER TRANSFORM, AND CCK MODULATION AND DEMODULATION APPARATUS USING THE SAME

FIELD OF THE INVENTION

The present invention relates to a Fast Fourier Transform (FFT) apparatus for selectively performing Fast Hadamard transform (FHT), and a complementary code keying (CCK) modulation/demodulation apparatus using the same; and, more particularly, to a FFT apparatus selectively performing FHT and a CCK modulation/demodulation apparatus for selectively performing FHT or CCK modulation/demodulation by using a FFT device in order to process a fast transform and to detect a symbol.

DESCRIPTION OF RELATED ARTS

Generally, IS95 CDMA base station demodulates a FHT-modulated signal using one of 64 hadamard quadrature codes based on 6 bits of terminal user information as an indicator when a backward transmitting signal is received. Accordingly, a receiver of a CDMA communication system can effectively receives a signal.

An orthogonal frequency division multiple (OFDM) transceiving terminal, which is adopted by the wireless local area network (WLAN) standard, 802.11a, demodulates a signal based on the FFT scheme. Accordingly, the transceiving terminal of an OFDM communication system can effectively transmit and receive a signal.

Another WLAN standard 802.11b adopts CCK modulation/demodulation (FWT) scheme to obtain high data rate. It is one of general block code modulation scheme.

The WLAN standard 802.11g is a communication standard unifying the WLAN standard 802.11a and the WLAN standard 802.11b. Accordingly, a communication system employing the WLAN standard 802.11g can alternatively modulate and demodulate a signal either or the FFT scheme and the CCK modulation/demodulation scheme. Since the FFT scheme and the CCK scheme modulate or demodulate a signal by using different modulation and demodulation scheme, they must be embodied as separate hardware. Furthermore, each communication system employing the WLAN standard 802.11g must include both of a receiver for FFT and another receiver for CCK.

SUMMARY OF THE INVENTION

It is, therefore, an object of the present invention to provide a FFT apparatus selectively performing FHT and a CCK modulation/demodulation apparatus for selectively performing FHT or CCK modulation/demodulation by using a FFT device in order to process a fast transform and to detect a symbol.

In accordance with an aspect of the present invention, there is provided a Fast Fourier Transform (FFT) apparatus selectively performing a Fast Hadamard Transform (HFT), including N signal processing unit connected in serial according to a $2^N$ length of a code, where N is a positive integer, Wherein each of N signal processing unit has: a storing unit for temporally storing and outputting an output signal of a first multiplexing unit; an adding unit for adding the output signal of the storing unit and an input signal; a subtracting unit for subtracting the input signal from the output signal of the storing unit; a multiplying unit for multiplying a phase coefficient to the output signal of the subtracting unit and outputting the multiplied signal; a first multiplexing unit for selecting one of the output signal of the multiplying unit and the input signal; and a second multiplexing unit for selecting one of the output signal of the adding unit and the output signal of the storing unit, wherein $2^{nd}$ to $N^{th}$ signal processing unit receive an output signal of a second multiplexing unit of $(N-1)^{th}$ signal processing unit and $N^{th}$ signal processing unit includes $2^{N-1}$ storing unit connected in serial.

In accordance with another aspect of the present invention, there is provided a complementary code keying (CCK) demodulation apparatus including N signal processing unit connected in serial according to a $2^N$ length of a code, where N is a positive integer, wherein each of N signal processing unit has: a first storing unit for temporally storing and outputting an output signal of a first multiplexing unit; a first symbol detecting unit for converting a sum of values, generated by multiplying a conjugated value to an odd chip and an even chip, and obtaining a soft decision value of a first predetermined phase; a second symbol detecting unit for multiplexing the first predetermined phase, conjugating the multiplexed signal, multiplying the conjugated signal to the output signal of the first storing unit, and demultiplexing the multiplied signal; a first multiplexing unit for selecting one of a first signal, which is demultiplexed by the second symbol detecting unit, and an input signal; an adding unit for adding a second signal, which is demultiplexed by the second symbol detecting unit, and a chip signal or adding the second signal and an output signal of an adding unit of a previous signal processing unit, and outputting the adding signal; a second storing unit for providing a last received chip to the adding unit in a first signal processing unit; a complex number/phase converting unit for converting the output signal (complex number) of the adding unit to a phase, and outputting a second predetermined phase; and a second multiplexing unit for selecting one of the input signal and the output signal of the first storing unit, wherein $2^{nd}$ to $N^{th}$ signal processing unit receive an output signal of a second multiplexing unit of $(N-1)^{th}$ signal processing unit and $N^{th}$ signal processing unit includes $2^{N-1}$ first storing unit connected in serial.

In accordance with still another aspect of the present invention, there is provided a complementary code keying demodulation apparatus, including N signal processing unit connected in serial according to a $2^N$ length of a code, where N is a positive integer, wherein each of N signal processing unit has: a first storing unit for temporally storing and outputting an output signal (phase) of a first multiplexing unit; a first symbol detecting unit for converting a sum of values, generated by multiplying a conjugated value to an odd chip and an even chip, and obtaining a soft decision value of a first predetermined phase; a second symbol detecting unit for multiplexing the first predetermined phase, subtracting the multiplexed signal from the output signal (phase) of the first storing unit, and demultiplexing the subtracted signal; a first multiplexing unit for selecting one of a first signal (phase), which is demultiplexed by the second symbol detecting unit, and an input signal (phase); an adding unit for adding a second signal (phase), which is demultiplexed by the second symbol detecting unit, and a chip signal or adding the second signal and an output signal (complex number) of an adding unit of a previous signal processing unit, and outputting the adding signal; a second storing unit for providing a last received chip to the adding unit in a first signal processing unit; a second complex number/phase converting unit for converting the output signal (complex number) of the adding unit to a phase, and outputting a second predetermined phase in a last signal processing unit; and a second multiplexing unit for selecting one of the input signal (phase) and the output signal (phase) of the first storing unit, wherein $2^{nd}$ to $N^{th}$ signal processing unit receive an output signal of a second multiplexing unit of $(N-1)^{th}$ signal processing unit and $N^{th}$ signal processing unit includes $2^{N-1}$ first storing unit connected in serial.

In accordance with further still another aspect of the present invention, there is provided a complementary code keying (CCK) demodulation apparatus, including: a correlation unit configured as a butter fly structure for outputting 16 first correlation values obtained from a first to a fourth chip signals among 8 chip signals in a set of 4 in parallel, and outputting 16 second correlation values obtained from a fifth to a eighth chip signals among 8 chip signals in a set of 4 in parallel; a first and a second storing unit for storing 16 of the first correlation values and 16 of the second correlation values outputted from the correlation unit; a first and second complex number/phase converting unit for converting 4 parallel signals (complex number) outputted from the first and the second storing unit to a phase value; a quantization unit for calculating a difference between the first and the second complex number/phase converting unit and quantizing the difference; a phase converting unit for converting a phase of 4 parallel signals outputted from the second storing unit according to the quantization value of the quantizing unit; an absolute value calculating unit for calculating a size of a signal by subtracting 4 parallel signals outputted from the first storing unit and the output signal of the phase converting unit; and a comparing and storing unit for storing a largest value among four value having a decided value, comparing the largest value with four next input signals, and storing the largest value.

BRIEF DESCRIPTION OF THE DRAWINGS

The above and other objects and features of the present invention will become better understood with regard to the following description of the preferred embodiments given in conjunction with the accompanying drawings, in which:

FIG. 10 is a block diagram of a correlator in a conventional CCK demodulation apparatus;

FIG. 12A and 12B are graphs showing a signal flow of the correlator shown in FIG. 11;

DETAILED DESCRIPTION OF THE INVENTION

Hereinafter, a Fast Fourier Transform (FFT) apparatus for selectively performing Fast Hadamard transform (FHT) will be described in more detail with reference to the accompanying drawings.

Figure 1:
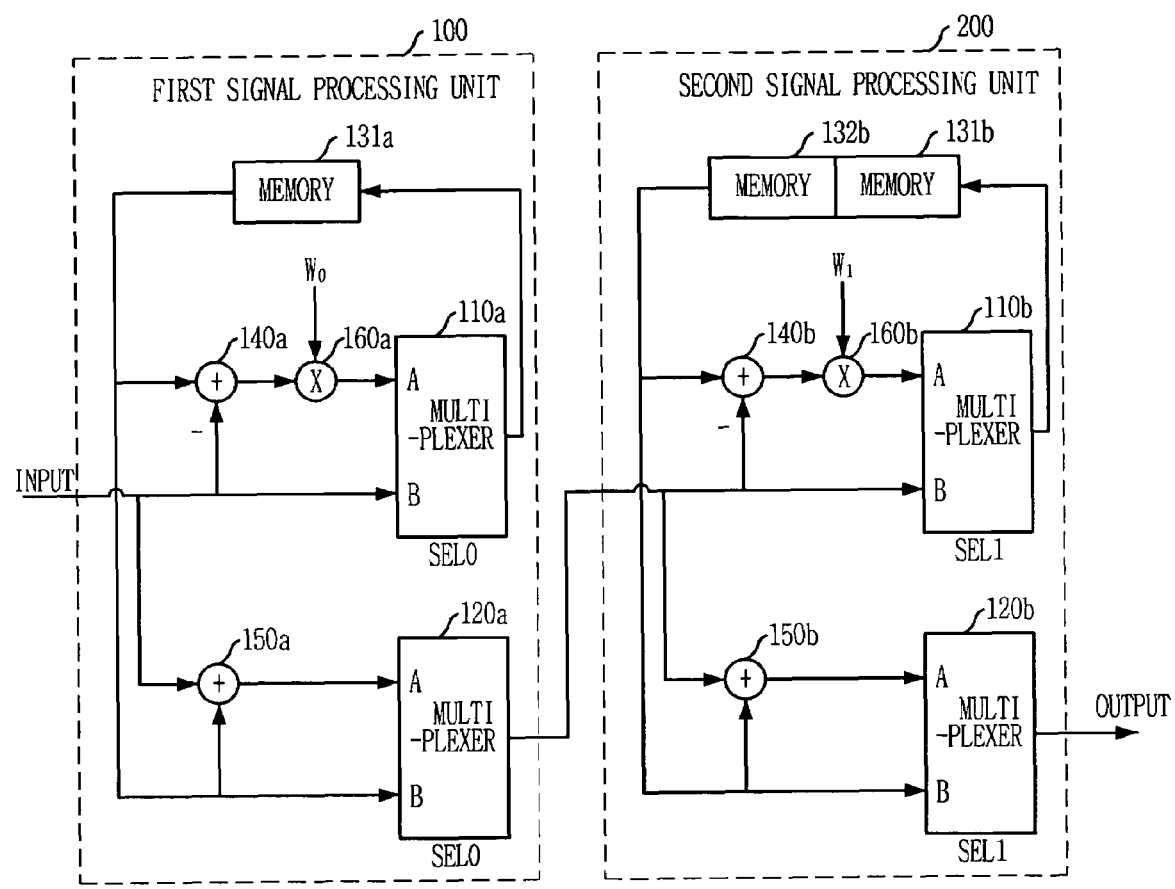
FIG. 1 is a block diagram of a FFT apparatus selectively performing a FHT in accordance with a preferred embodiment of the present invention.
Figure 4:
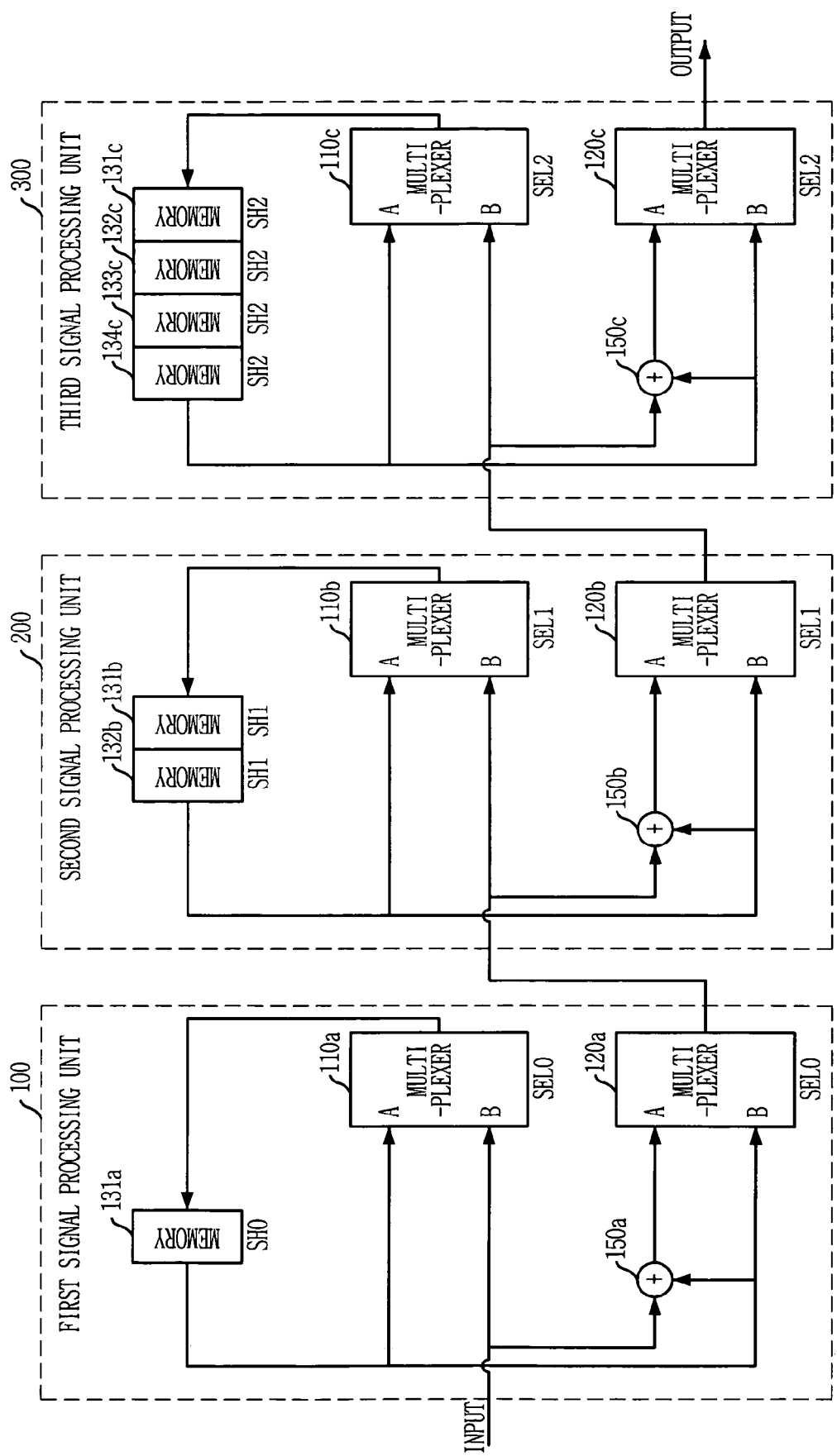
FIG. 4 is a block diagram of a CCK modulation apparatus using a FFT device in accordance with a preferred embodiment of the present invention.
Figure 6:
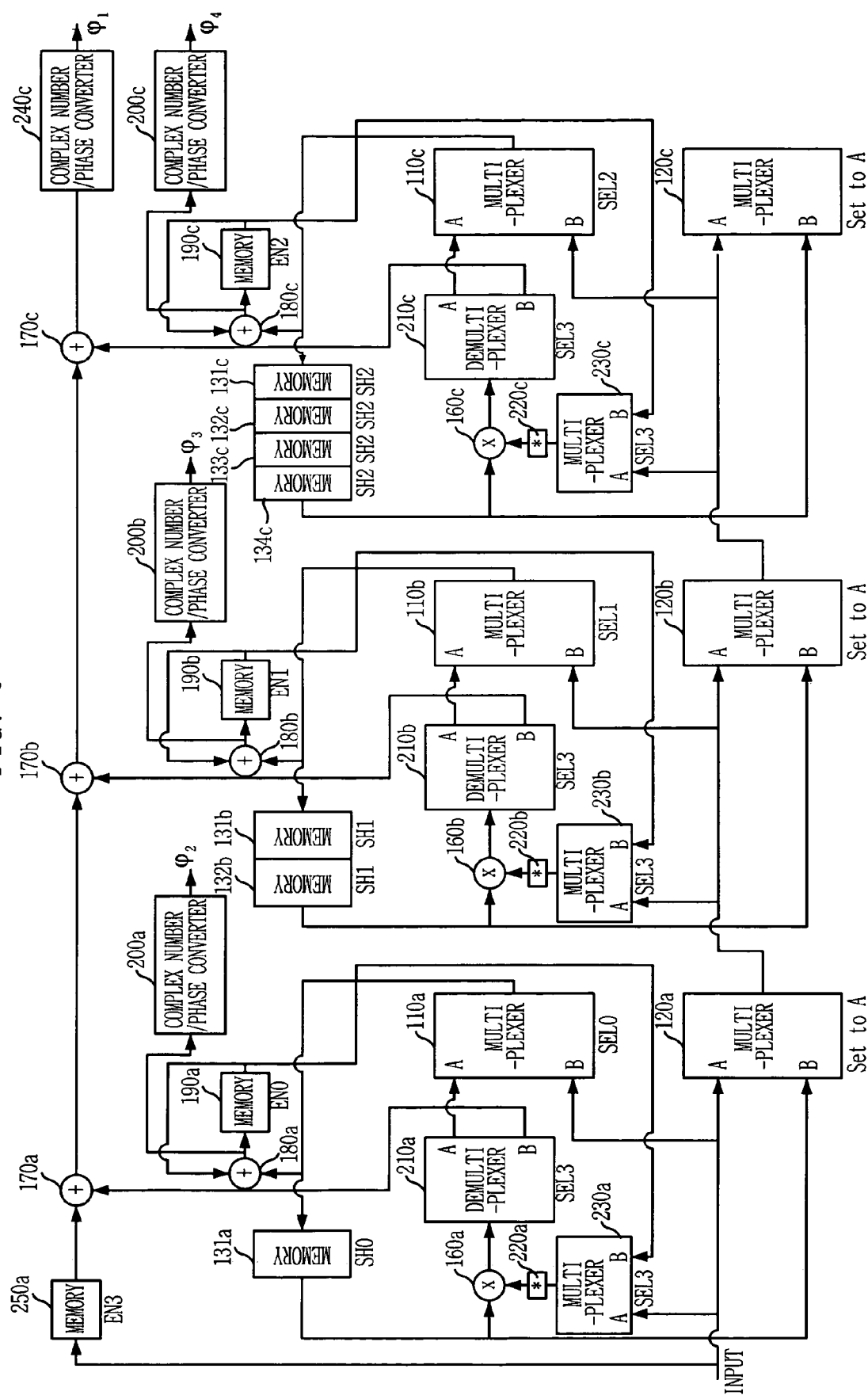
FIG. 6 is a block diagram of a CCK demodulation apparatus using a FFT device in accordance with a preferred embodiment of the present invention.
Figure 8:
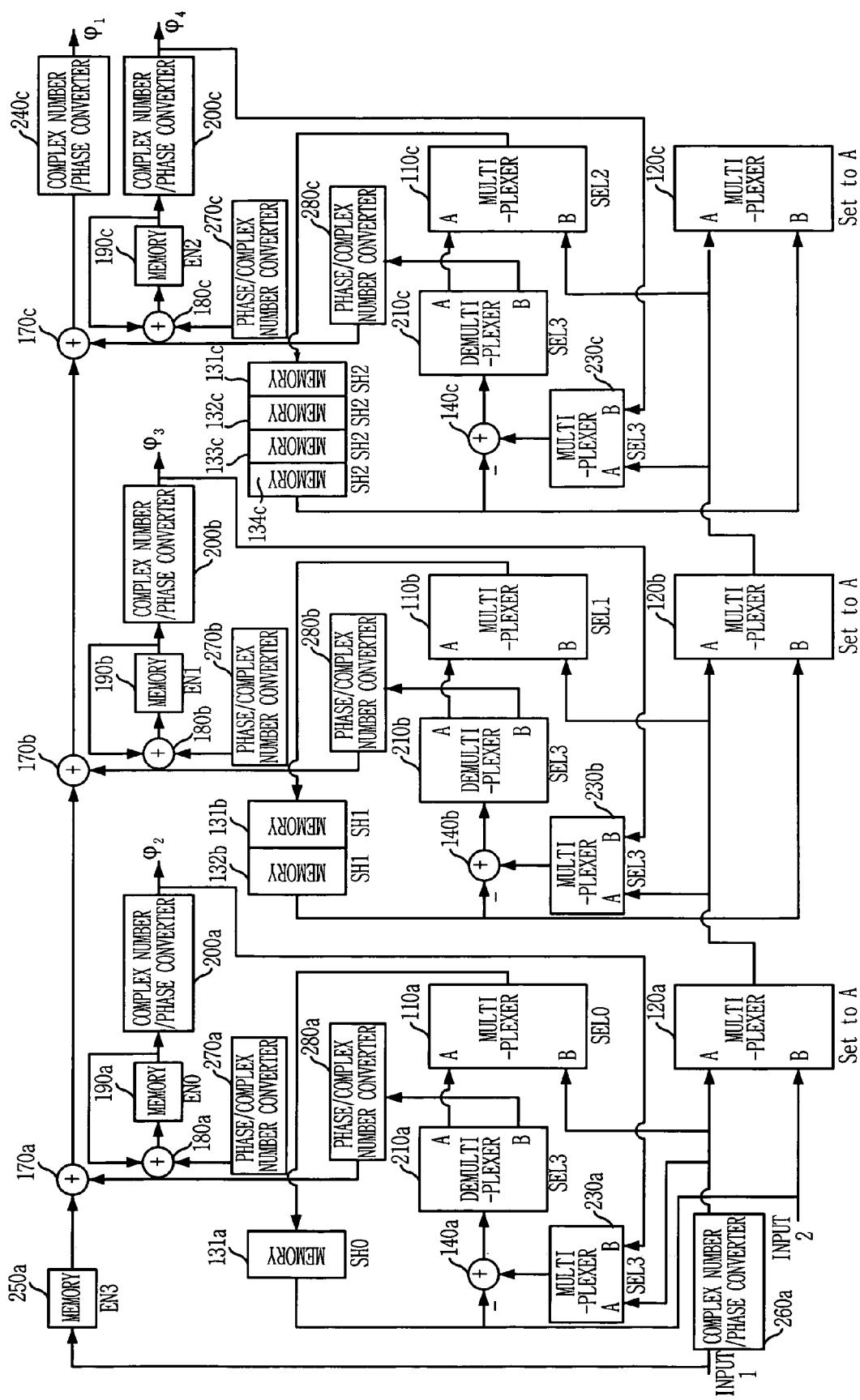
FIG. 8 is a block diagram of a CCK demodulation using a FFT device in accordance with another embodiment of the present invention.
Figure 13:
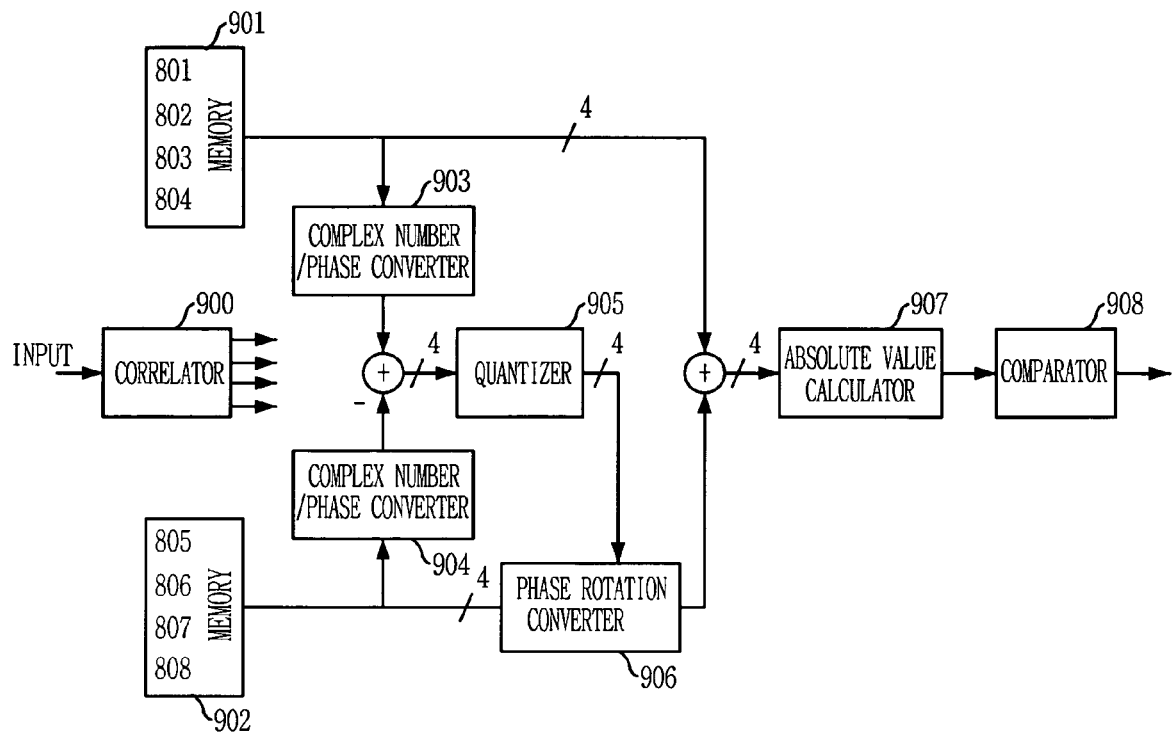
FIG. 13 is a block diagram of a CCK demodulation apparatus using a FFT device in accordance with another embodiment of the present invention.

The present invention relates to a FHT apparatus using a FFT module shown in FIG. 1, a CCK modulation apparatus shown in FIG. 4 and a CCK demodulation apparatus shown in FIGS. 6, 8 and 13 in order to use a FFT module for CCK modulation/demodulation. Herein, FHT is abbreviation for Fast Hadamard Transform, FFT is abbreviation for Fast Fourier Transform, and CCK is abbreviation for Complementary Code Keying.

The CCK modulation apparatus is classified into a suboptimal CCK modulation apparatus using a multiplier shown in FIG. 6, a suboptimal CCK modulation apparatus not using a multiplier shown in FIG. 8, and an optimal CCK apparatus shown in FIG. 13.

Generally, the CCK modulation is achieved as below Eq. 1. Such a CCK modulation is used in IEEE 802.11b standard. Also, IEEE 802.11g standard adopts the CCK modulation scheme with the orthogonal frequency division multiplexing (OFDM) scheme.

$$C = (e^{j(\phi_1+\phi_2+\phi_3+\phi_4)}, e^{j(\phi_1+\phi_3+\phi_4)}, e^{j(\phi_1+\phi_2+\phi_4)}, -e^{j(\phi_1+\phi_4)}, e^{j(\phi_1+\phi_2+\phi_3)}, e^{j(\phi_1+\phi_3)}, -e^{j(\phi_1+\phi_2)}, e^{j(\phi_1)}) \quad \text{Eq. 1}$$

For example, when data is transmitted in 11 Mbps according to IEEE 802.11b standard, the 8 bit data is modulated to 8-chip information as shown in Eq. 1 to transmit the 8 bit data. Herein, $\phi_1$ is a value modulated by first two bits based on the differential quadrature phase shifting key (DQPSK) scheme. $\phi_2, \phi_3, \phi_4$ are values obtained by modulating 2 bits of each among 6 bits based on quadrature phase shifting key (QPSK) modulation scheme. Such a modulation scheme is durable to a multi-path signal.

Phase terms of each chip in Eq. 1 can be expressed as below Eq. 2.

$$\Phi = \begin{bmatrix} \phi_1 + \phi_2 + \phi_3 + \phi_4 \\ \phi_1 + \phi_3 + \phi_4 \\ \psi_1 + \psi_2 + \psi_4 \\ \phi_1 + \phi_4 \\ \phi_1 + \phi_2 + \phi_3 \\ \phi_1 + \phi_3 \\ \phi_1 + \phi_2 \\ \phi_1 \end{bmatrix} = \text{BRACE} \equiv A \begin{bmatrix} 1111 \\ 1011 \\ 1101 \\ 1001 \\ 1110 \\ 1010 \\ 1100 \\ 1000 \end{bmatrix} \begin{bmatrix} \phi_1 \\ \phi_2 \\ \phi_3 \\ \phi_4 \end{bmatrix} \quad \text{Eq. 2}$$

If a matrix A's 0 values become '−1', each of columns is orthogonal to each others, and each of columns is related to hadamarda code.

The hadamarda code is formed as Eq. 4 by repetition of a matrix shown in Eq. 3.

$$H_k = \begin{bmatrix} H_{k-1} & H_{k-1} \\ H_{k-1} & -H_{k-1} \end{bmatrix} \quad \text{Eq. 3}$$

$$H_0 = 1,$$

$$H_1 = \begin{bmatrix} 1 & 1 \\ 1 & -1 \end{bmatrix},$$

$$H_2 = \begin{bmatrix} 1 & 1 & 1 & 1 \\ 1 & -1 & 1 & -1 \\ 1 & 1 & -1 & -1 \\ 1 & -1 & -1 & 1 \end{bmatrix},$$

$$H_3 = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \quad \text{Eq. 4}$$

$$= [h_{31}\ h_{32}\ h_{33}\ h_{34}\ h_{35}\ h_{36}\ h_{37}\ h_{38}]$$

Herein, $h_{3i}$ is $i^{th}$ column of $H_3$ matrix. When 8×1 input signal X, an output hadamard transform signal B(8×1) is expressed as Eq. 5.

$$B = H_3 X \quad \text{Eq. 5}$$

Also, a signal demodulated in a receiver can be obtained as Eq. 6 by applying a reverse matrix of $H_3$. Since each column of a matrix H3 is orthogonal, the reverse matrix of H3 is $\frac{1}{8}H_3$, where ⅛ is power normalization factor of matrix H3.

$$X = \tfrac{1}{8} H_3 B \quad \text{Eq. 6}$$

Such a hadamarda transform can be embodied by setting always '1' as a phase shift coefficient of FFT.

Eq. 2 for CCK modulation is a walsh code expressed as Eq. 7.

$$\Phi = \begin{bmatrix} \phi_1 + \phi_2 + \phi_3 + \phi_4 \\ \phi_1 + \phi_3 + \phi_4 \\ \phi_1 + \phi_2 + \phi_4 \\ \phi_1 + \phi_4 \\ \phi_1 + \phi_2 + \phi_3 \\ \phi_1 + \phi_3 \\ \phi_1 + \phi_2 \\ \phi_1 \end{bmatrix} \quad \text{Eq. 7}$$

$$= \begin{bmatrix} 1 & 1 & 1 & 1 & 1 & 1 & 1 & 1 \\ 1 & 0 & 1 & 0 & 1 & 0 & 1 & 0 \\ 1 & 1 & 0 & 0 & 1 & 1 & 0 & 0 \\ 1 & 0 & 0 & 1 & 1 & 0 & 0 & 1 \\ 1 & 1 & 1 & 1 & 0 & 0 & 0 & 0 \\ 1 & 0 & 1 & 0 & 0 & 1 & 0 & 1 \\ 1 & 1 & 0 & 0 & 0 & 0 & 1 & 1 \\ 1 & 0 & 0 & 1 & 0 & 1 & 1 & 0 \end{bmatrix} \begin{bmatrix} \phi_1 \\ \phi_2 \\ \phi_3 \\ 0 \\ \phi_4 \\ 0 \\ 0 \\ 0 \end{bmatrix} = T\Theta$$

However, reverse transform of matrix T cannot be easily obtained because each column of the matrix T is not orthogonal. Although the reverse transform of matrix T is obtained, each value of reverse transformed matrix must be expressed as simple phase shift. It can be easily obtained through the matrix T and matrix $H_3$. The matrix T can be expressed as Eq. 8 as $H_3$ and $h_{31}$.

$$T = \tfrac{1}{2}(H_3 + h_{31} h_{31}^T) \quad \text{Eq. 8}$$

Wherein, $h_{31} h_{31}^T$ is below Eq. 9.

$$h_{31} h_{31}^T \equiv \left( \begin{bmatrix} 1 \\ 1 \\ 1 \\ 1 \\ 1 \\ 1 \\ 1 \\ 1 \end{bmatrix} \cdot [1\ 1\ 1\ 1\ 1\ 1\ 1\ 1] \right) \quad \text{Eq. 9}$$

$$= \begin{bmatrix} 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \end{bmatrix}$$

A reverse transform of the matrix T can be obtained as Eq. 11 by below Eq. 10 which is matrix reverse formation rule.

$$(A + BCD)^{-1} = A^{-1} - A^{-1} B(C^{-1} + DA^{-1}B)^{-1} DA^{-1} \quad \text{Eq. 10}$$

$$A \in n \times n,\ B \in n \times r,\ C \in r \times r,\ D \in r \times n$$

$$\begin{aligned} T^{-1} &= 2(H_3 + h_{31} h_{31}^T)^{-1} \\ &= 2\left(H_3^{-1} - H_3^{-1} h_{31}(1 + h_{31}^T H_3^{-1} h_{31})^{-1} h_{31}^T H_3^{-1}\right) \\ &= 2\left(\tfrac{1}{8} H_3 - \tfrac{1}{8} H_3 h_{31}\left(h_{31}^T\left(1 + h_{31}^T \tfrac{1}{8} H_3 h_{31}\right)^{-1} h_{31}^T \tfrac{1}{8} H_3\right)\right) \\ &= \tfrac{1}{4} H_3 - \begin{bmatrix} 1 \\ 0 \\ 0 \\ 0 \\ 0 \\ 0 \\ 0 \\ 0 \end{bmatrix} \cdot [1\ 0\ 0\ 0\ 0\ 0\ 0\ 0] \end{aligned} \quad \text{Eq. 11}$$

By using Eq. 11, $\Phi$ can be recovered to $\Theta$ as below Eq. 12.

$$\Theta = \left( \frac{1}{4}H_3 - \begin{bmatrix} 1 \\ 0 \\ 0 \\ 0 \\ 0 \\ 0 \\ 0 \\ 0 \end{bmatrix} [1\ 0\ 0\ 0\ 0\ 0\ 0\ 0] \right) \Phi \quad \text{Eq. 12}$$

$$= \frac{1}{4}\begin{bmatrix} 8\phi_1 + 4\phi_2 + 4\phi_3 + 4\phi_4 \\ 4\phi_2 \\ 4\phi_3 \\ 0 \\ 4\phi_4 \\ 0 \\ 0 \\ 0 \end{bmatrix} - \begin{bmatrix} \phi_1 + \phi_2 + \phi_3 + \phi_4 \\ 0 \\ 0 \\ 0 \\ 0 \\ 0 \\ 0 \\ 0 \end{bmatrix}$$

That is, a reverse transform of walsh code T can be expressed as a hadamard code H3, and it is same value subtracting a first element of $\Phi$ from $\frac{1}{4}H_3$ transformed from $\Phi$. Since the reverse transform of the walsh code matrix T can be expressed as the hadamarda code, it can be modulated/demodulated by using a FFT module. Modulation in Eq. 12 theoretically shows a relation between the hadamard transform and a walsh transform. A transmitting signal is attenuated and noised while the transmitting signal travels through a channel in real communication environment. In order to receive such a transmitting, a special modulation scheme is required in a receiver.

At first, in order to use a FFT module for CCK modulation/demodulation scheme, a FHT transform of a code having $2^2$ length using the FFT module will be explained.

FIG. 1 is a block diagram illustrating a FFT apparatus selectively performing a FHT in accordance with a preferred embodiment of the present invention.

As shown in FIG. 1, a module selectively performing a FFT and a FHT includes a first signal processing unit 100 and the second signal processing unit 200.

The first signal processing unit 100 includes: multiplexers 110a, 120a having two input terminals A, B; a memory 131A storing single input signal (INPUT), a subtracter 140A, an adder 150A, and a multiplier 160A.

The second signal processing unit 200 includes: multiplexer 110B, 120B having two input terminals A, B; memories 131B, 132B each of which for storing signal input signal, a subtracter 140B, an adder 150B, and a multiplier 160B.

An output signal of the first signal processing unit 100 is an input signal of the second signal processing unit 200, and an output signal of the multiplexer 120A and another output signal of the multiplexer 120B are the output signal of the first signal processing unit 100 and the second signal processing unit 200, respectively.

In case of a code having a length of $2^2$, the FFT apparatus selective performing the FHT includes: a memory 131A for temporally storing an output signal of a multiplexer 110A and outputting the stored output signal; an adder 150A for adding an input signal (INPUT) to the output signal of the memory 131A; a subtracter 140A for subtracting an input signal (INPUT) from the output signal of the memory 131A; a multiplier 160A for multiplying a phase coefficient $W_0$ to the output signal of the subtracter 140A; a multiplexer 110A for selecting one of the output signal of the adder 160A and the input signal (INPUT); a multiplexer 120A for selecting one of the output signal of the adder 150A and the output signal of the memory 131A; a memory 131B for temporally storing the output signal of the multiplexer 110B and outputting the stored output signal; a memory 132B for temporally storing the output signal of the memory 131B and outputting the stored output signal; an adder 150B for adding the output signal of the memory 132B and the output signal of the multiplexer 120A, and outputting the added signal; a subtracter 140B for subtracting the output signal of the multiplexer 120A from the output signal of the memory 132B, and outputting the subtracted signal; a multiplier 160B for multiplying a phase coefficient $W_1$ to the output signal of the subtracter 140B; a multiplexer 110B for selecting one of the output signal of the multiplier 160B and the output signal of the multiplexer 120A; and a multiplexer 120B for selecting one of the output signal of the adder 150B and the output signal of the memory 132B.

Inhere, the FHT can be performed by bypassing the output signal of the subtracters 140A, 140B to the multiplexers 110A, 110B without using the multipliers 160A and 160B.

In the first signal processing unit 100, an input signal (IN) is inputted to the input terminal B of the multiplexer 110A, and the output signal of the multiplier 160A inputs to the input terminal A of the multiplexer 110A. The subtracter 140A subtracts the input signal from the output signal of the memory 131A, and outputs the subtracted signal. The multiplier 160A multiplies a phase coefficient $W_0$ to the output signal of the subtracter 140A, and outputs the multiplied signal to the multiplexer 110A. The output signal of the adder 150A inputs to the input terminal A of the multiplexer 131A, and the output signal of the memory 131A inputs to the input terminal B of the multiplexer 120A. Also, the adder 150A adds the input signal (INPUT) to the output signal of the memory 131A and outputs the added signal to the multiplexer 120A. The memory 131A temporally stores the output signal of the multiplexer 110A and outputs the stored signal.

In the second signal processing unit 220, the output signal of the first signal processing unit 100, that is, the output signal of the multiplexer 120A, inputs to the input terminal B of the multiplexer 110B, and the output signal of the multiplier 160B inputs to the input terminal A of the multiplexer 110B. The subtracter 140B subtracts the output signal of the multiplexer 120A from the output signal of the memory 132B. The multiplier 160B multiplies a phase coefficient $W_1$ to the output signal of the subtracter 140B and outputs the multiplied signal to the multiplexer 110B. The output signal of the adder 150B inputs to the input terminal A of the multiplexer 120B. The output signal of the memory 132B inputs to the input terminal B of the multiplexer 120B. The adder 150B adds the output signal of the multiplexer 120A to the output signal of the memory 132B, and outputs the added signal to the multiplexer 120B. The memory 132B temporally stores the output signal of the memory 131B, and outputs the stored signal. The memory 131B temporally stores the output signal of the multiplexer 110B and output the stored signal to the memory 132B.

Figure 2:
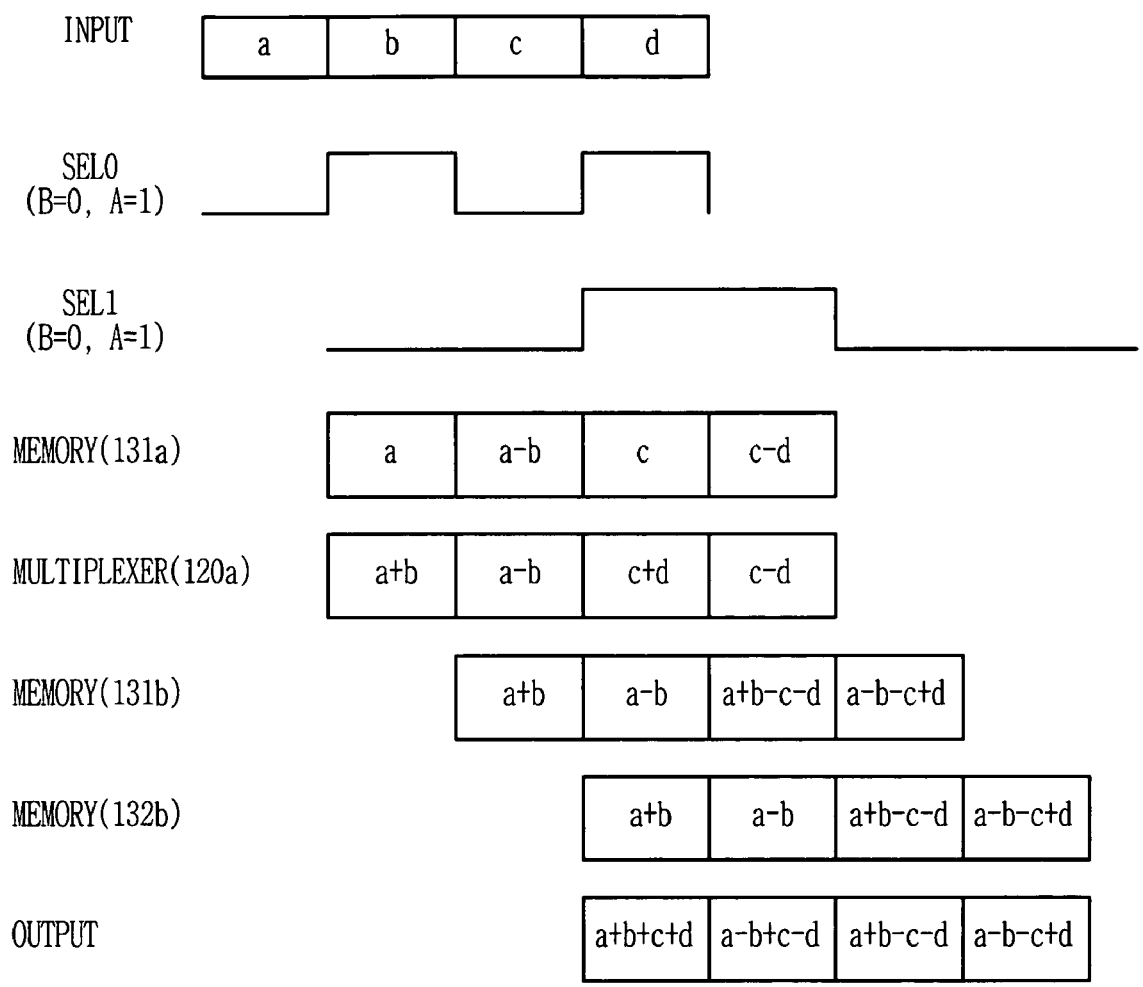
FIG. 2 is a graph showing a signal flow of the FHT shown in FIG. 1.

At first, the FHT transform can be achieve by bypassing with out the multipliers 160A and 160B. That is, $W_0=W_1=1$. Relations of signals of each part and a control signal are shown in FIG. 2. It is expressed as below Eq. 13.

$$\begin{bmatrix} a+b+c+d \\ a-b+c-d \\ a+b-c-d \\ a-b-c+d \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} a \\ b \\ c \\ d \end{bmatrix}$$ Eq. 13

Figure 3:
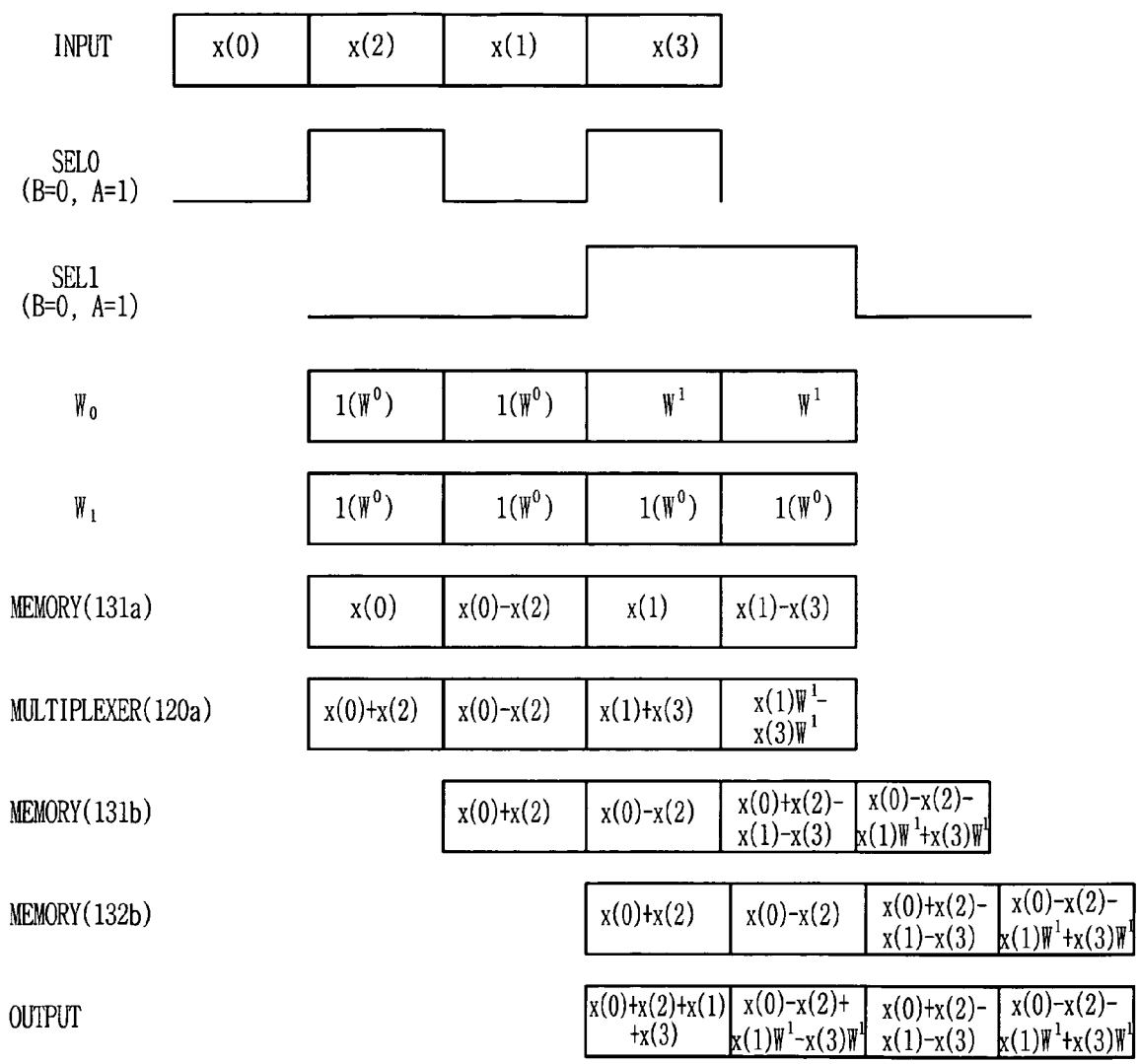
FIG. 3 is a graph showing a signal flow of the FFT shown in FIG. 1.

If a module of FIG. 1 is applied for the FFT, relations of signals of each part and a control signal are shown in FIG. 3. It is expressed as below Eq. 14.

$X(0)=x(0)+x(2)+x(1)+x(3)$ $X(1)=x(0)-x(2)+x(1)W^1-x(3)W^1$ $X(2)=x(0)+x(2)-x(1)-x(3)$ $X(3)=x(0)-x(2)-x(1)W^1+x(3)W^1$ Eq. 14

As described above, there are two signal processing units 100 and 200 are required for a code having length of $2^2$. If a length of a code is $2^3$, three signal processing units are required.

Accordingly, N signal processing units needs to be serially configured for a code having a length $2^N$. Input signal of $N^{th}$ signal processing unit is an output signal of a second multiplexer 120 of a $(N-1)^{th}$ signal processing unit, and $2^{N-1}$ memories of the $N^{th}$ signal process unit are serially connected. In this case, each of signal processing units performs the FHT by bypassing an output signal of a subtracter 140 without using a multiplier 160.

Hereinafter, a CCK modulation/demodulation apparatus using a module selectively performing a FHT and a FFT will be explained. The module selectively performing a FHT and a FFT is the FFT apparatus selective performing a FHT shown in FIG. 1.

At first, a CCK modulation module will be explained.

In order to use a FHT module for CCK modulation shown in Eq. 2, Eq. 2 must be transformed to Eq. 7. The walsh code 2 of Eq. 7 is same to a hadamard code $H_3$ exchanging 1- to 0 of Eq. 4 when a length is $2^3$. It means that the FHT module without subtracting operation is identical to fast walsh transform (FWT). Accordingly, the CCK modulation can be embodied by using Eq. 7 with the FHT module without using a subtracting operation.

The CCK modulation apparatus shown in FIG. 4 includes a first signal processing unit 100, a second signal processing unit 200 and a third signal processing unit 300. That is, the CCK modulation apparatus shown in FIG. 4 is for $2^3$ of code length.

The first signal processing unit 100 and the second signal processing unit 200 is identical to signal processing units shown in FIG. 1 exclusive of subtracters 140A, 140B and multipliers 160A, 160B. The third signal processing unit 300 is identical to the first and the second signal processing unit 100, 200 excepting four memories 131C, 132C, 133C, 134C.

As shown in FIG. 4, when a code length is $2^3$, the CCK modulation apparatus includes a memory 131A for temporally storing an output signal of a multiplexer 110A and outputting the stored signal; an adder 150A for adding an output signal of the memory 131A and an input signal; a multiplexer 110A for selecting one of the output signal of the memory 131A and an input signal; a multiplexer 120A for selecting one of the output signal of the adder 150A and the output signal of the memory 131A; a memory 131B for temporally storing the output signal of the multiplexer 110B and outputting stored signal; a memory 132B for temporally storing an output signal of the memory 131B and outputting the stored signal; an adder 150B for adding the output signal of the memory 132B and the output signal of the multiplexer 120A; a multiplexer 110B for selecting one of the output signal of the multiplexer 120A and the output signal of the multiplexer 120B; a multiplexer 120B for selecting one of the output signal of the adder 150B and the output signal of the memory 132B; the memory 131C for temporally storing the output signal of the multiplexer 110C and outputting the stored signal; a memory 132C for temporally storing the output signal of the memory 131C and outputting the stored signal; a memory 133C for temporally storing the output signal of the memory 132C and outputting the stored signal; a memory 134C for temporally storing the output signal of the memory 133C and outputting the stored signal; an adder 150C for adding the output signal of the memory 134C and the output signal of the multiplexer 120B; a multiplexer 110C for selecting one of the output signal of the memory 134C and the output signal of the multiplexer 120B; and a multiplexer 120C for selecting one of the output signal of the adder 150C and the output signal of the memory 134C.

Figure 5:
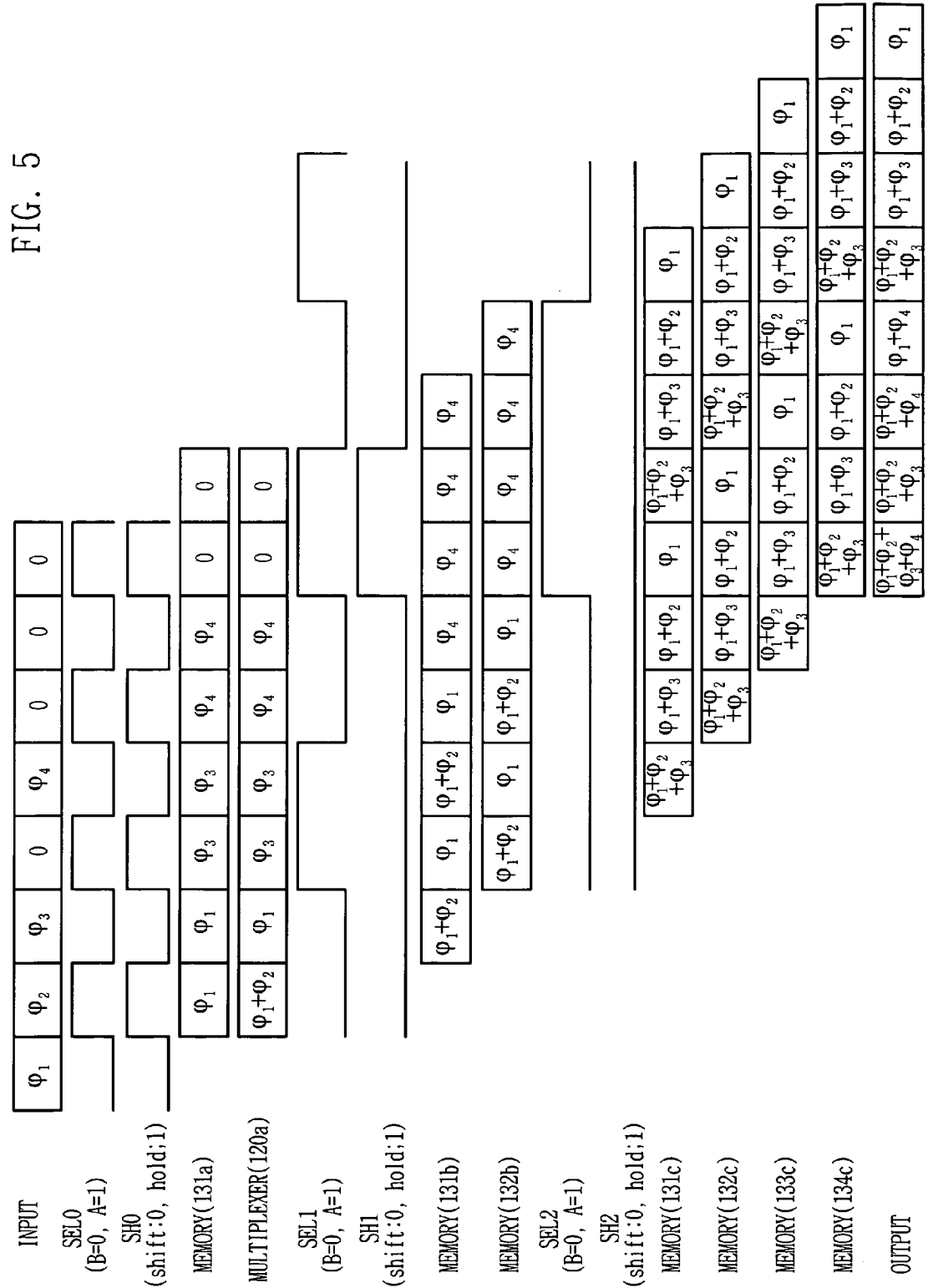
FIG. 5 is a graph showing a signal flow of the CCK modulation apparatus shown in FIG. 4.

FIG. 5 shows signal flow of the CCK modulation apparatus shown in FIG. 4. As shown, the memories 131A, 131B, 132B, 131C, 132C, 133C and 134C in each of signal processing units 100 to 300 determine whether an input value of memory is received or not according to a signal SH0, SH1, SH2. By transforming the output signal (phase) to a complex number and reversing a signal of fourth and seventh signal, a CCK modulation signal can be obtained as shown in Eq. 1. As described above, a conventional transmitting unit employing IEEE 802.11g WLAN standard includes the FFT module for supporting a transmitting function for 802a. 11 and also includes the CCK modulation module for supporting 802.11b. However, the CCK modulation apparatus shown in FIG. 4 can perform both of transmitting functions in 802.11a and 802.11b by using single FFT module.

In FIG. 4, the CCK modulation apparatus includes three signal processing units for $2^3$ of code length. But, if the length of a code is $2^4$, a CCK modulation apparatus requires four signal processing units.

Accordingly, when N signal processing units are configured in serial for 2N code length, input signals of $N^{th}$ signal processing unit are output signal of multiplexers 120A and 120B of $(N-1)^{th}$ signal processing unit. And, $2^{N-1}$ memories are serially configured in an $N^{th}$ signal processing unit. For example, $4^{th}$ signal processing unit has 8 memories serially connected.

Hereinafter, a CCK demodulation apparatus will be explained.

Eq. 12 shows a relation between hadamarda transform and walsh transform. A transmitting signal is noised and attenuated while the transmitting signal travels through a channel in real communication environment. If there is no noise or attenuation, the transmitting signal can be modulated as shown Eq. 1. However, there is no such a communication environment in real communication environment. Although a communication environment has only noises without attenuation, a performance of a receiver of Eq. 12 will be badly degraded. Accordingly, in order to receive the noised and attenuated transmitting signal, a special demodulation scheme is required. As the demodulation scheme for receiving the noised and attenuated transmitting signal, there are an optimized demodulation scheme and a suboptimal demodulation scheme.

Hereinafter, the suboptimal demodulation scheme has less complexity than the optimized demodulation scheme when they are embodied as an apparatus. Accordingly, Eq. 15 is obtained by maximally using each chip from received 8 chips as a demodulation scheme that can be embodied as a simple structure without badly degrading a performance compared to the optimized demodulation scheme.

$$\phi_2 = \arg\{x_1 x_2^* + x_3 x_4^* + x_5 x_6^* + x_7 x_8^*\}$$

$$\phi_3 = \arg\{x_1 x_3^* + x_2 x_4^* + x_5 x_7^* + x_6 x_8^*\}$$

$$\phi_4 = \arg\{x_1 x_5^* + x_2 x_6^* + x_3 x_7^* + x_4 x_8^*\}$$

$$\phi_1 = \arg\{x_4 e^{-j\phi_4} + x_6 e^{-j\phi_3} + x_7 e^{-j\phi_2} + x_8\} \quad \text{Eq. 15}$$

In order to obtain the suboptimal demodulation scheme of Eq. 15, $\phi_2$, $\phi_3$, $\phi_4$ are calculated from 8 received chips $x_1$, $x_2$, $x_3$, $x_4$, $x_5$, $x_6$, $x_7$, $x_8$ by using total 12 complex number multipliers. If general multipliers are used, they will occupy wide area and a complexity will increase.

Accordingly, the suboptimal demodulation scheme of Eq. 15 includes distinct formation of multiplying pairs in order to effectively embody the suboptimal demodulation scheme. At first, $\phi_2$ is obtained by multiplying conjugated value to add chip and even chip. $\phi_3$ is obtained by multiplying odd chips and multiplying even chips. $\phi_4$ is obtained by multiplying chips having 4 difference. Herein, since a conjugating operation is same as multiplying a minus sign to a phase value, if a natural log is applied to each multiplying pair, for example $x_1 x_2^*$ in Eq 15, multiplying operation would be transformed to a subtracting operation about two phase terms such as $\ln(x_1) - \ln(x_2)$. Accordingly, such a computation can be effectively achieved by using the FFT module.

Figure 7:
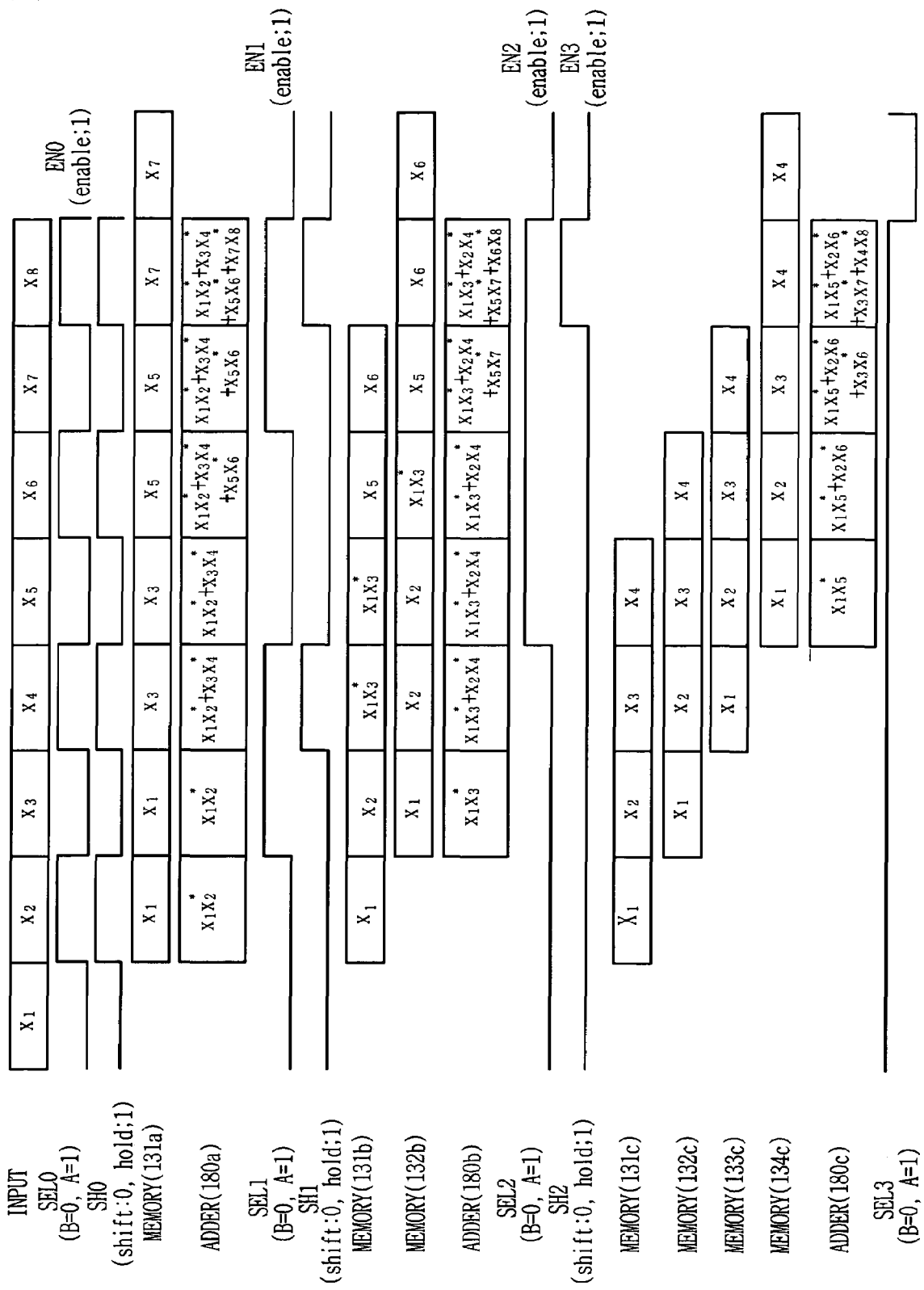
FIG. 7 is a graph showing a signal flow of the CCK demodulation apparatus shown in FIG. 6.

FIG. 6 is a block diagram illustrating a CCK demodulation apparatus using a FFT apparatus in accordance with a preferred embodiment of the present invention. That is, FIG. 6 shows the suboptimal CCK demodulation apparatus using a multiplier. A signal flow of the suboptimal CCK demodulation apparatus using the multiplier is shown in FIG. 7.

When a code length is $2^3$, the suboptimal CCK demodulation apparatus is embodied by using 3 multipliers 160A, 160B and 160C.

Conjugates 220A, 220B, 220C are blocks computing an operation of a+jb⇒a−jb on an input signal a+jb.

An adder 180A and a memory 190A stores a sum of values obtains by multiplying a conjugated value to an odd chip and an even chip in order to obtain $\phi_2$ in Eq. 5, and a soft decision value of $\phi_2$ is obtained by passing through a complex number/phase converter 200A. Also, each of complex number/phase converters 200B, 200C converting a complex number to a phase calculate soft decision values of $\phi_3$, $\phi_4$, respectively.

A value of $\phi_1$ inputs to a terminal B through multiplexers 230A, 230B, 230C when complex numbers corresponding to $\phi_2$, $\phi_3$, $\phi_4$ are outputted, and also, the value of $\phi_1$ inputs to adders 170A, 170B, 170C through a terminal B of conjugators 220A, 220B, 220C, multipliers 160A, 160B, 160C and demultiplexers 210A, 210B, 210C. Herein, if a memory 250A inputs $8^{th}$ chip $x_8$ to an adder 170A, computations are orderly performed to obtain a soft decision value for $\phi_1$ by finally passing through a complex number/phase converter 240C.

The complex number/phase converters 220A, 220B, 220C and 240C can be implemented to quickly calculate by using a lookup table. The memories 250A, 190A, 190B and 190C are controlled by signals EN0, EN1, EN2 and EN3 shown in FIG. 7.

The suboptimal CCK demodulation apparatus as described above includes three signal processing units each of which uses single adder 160A, 160B, 160C, respectively for $2^3$ code length. However, four signal processing units are required for a suboptimal CCK demodulation apparatus for $2^4$ of a code length.

Accordingly, when the code length is $2^3$, the first signal processing unit of the suboptimal CCK demodulation apparatus includes a memory 131A for temporally storing and outputting the output signal of the multiplexer 110A; an adder 180A, a memory 190A, a complex number/phase converter 220A for obtaining a soft decision value of $\phi_2$ phase by converting a complex number obtained through multiplying a conjugated value to an odd chip and an even chip and summing the multiplied values to a phase; a multiplexer 230A, a conjugator 220A, a multiplier 160A, a demultiplexer 210A for multiplexing $\phi_2$ phase, conjugating the multiplexed phase, multiplying the conjugated value with the output signal of the memory 131A; a multiplexer 110A for selecting one of the demultiplexed a first signal and an input signal; an adder 170A for adding a demultiplexed second signal and a chip signal $x_8$, and outputting the added value to an adder 170B of the second signal processing unit; a memory 250A for providing the last chip $x_8$ of received data to the adder 170A; and a multiplexer 120A for selecting one of an input signal and the output signal of the memory 131A.

The second signal processing unit of the suboptimal CCK demodulation apparatus includes a memory 131B for temporally storing and outputting the output signal of the multiplexer 110B; a memory 132B for temporally storing and outputting the output signal of the memory 131B; an adder 180B, a memory 190B, a complex number/phase converter 200B for obtaining a soft decision value of $\phi_3$ phase by converting a complex number obtained through multiplying a conjugated value to an odd chip and an even chip and summing the multiplied values to a phase; a multiplexer 230B, a conjugator 220B, a multiplier 160B, a demultiplexer 210B for multiplexing $\phi_3$ phase, conjugating the multiplexed phase, multiplying the conjugated value with the output signal of the memory 132B; a multiplexer 110B for selecting one of the demultiplexed a first signal and an input signal, that is, the output signal of the multiplexer 120A of the first signal processing unit; an adder 170B for adding a demultiplexed second signal and the output signal of the adder 170A of the first signal processing unit, and outputting the added value to an adder 170C of the third signal processing unit; and a multiplexer 120B for selecting one of the output signal of the multiplexer 120A and the output signal of the memory 132B.

The third signal processing unit of the suboptimal CCK demodulation apparatus includes: a memory 131C for temporally storing and outputting the output signal of the multiplexer 110C; a memory 132C for temporally storing and outputting the output signal of the memory 131C; a memory 133C for temporally storing and outputting the output signal of the memory 132C; a memory 134C for temporally storing and outputting the output signal of the memory 133C; an adder 180C, a memory 190C, a complex number/phase converter 200C for obtaining a soft decision value of $\phi_3$ phase by converting a complex number obtained through multiplying a conjugated value to an odd chip and an even chip and summing the multiplied values to a phase; a multiplexer 230C, a conjugator 220C, a multiplier 160C, a demultiplexer 210C for multiplexing $\phi_3$ phase, conjugating the multiplexed phase, multiplying the conjugated value with the output signal of the memory 134C; a multiplexer 110C for selecting one of the demultiplexed a first signal and an input signal, that is, the output signal of the multiplexer 120B of the second signal processing unit; an adder 170C for adding a demultiplexed second signal and the output signal of the adder 170B of the first signal processing unit, and outputting the added value to a complex/phase converter 240C; and a multiplexer 120B for selecting one of the output signal of the multiplexer 120C and the output signal of the memory 134C.

As described above, the suboptimal CCK demodulation apparatus includes N signal processing units connected in serial or $2^N$ code length where N is positive integer. $N^{th}$ processing unit receives input signals from the multiplexers of the $(N-1)^{th}$ signal processing unit. Also, $N^{th}$ signal processing unit $2^{N-1}$ memories connected in serial.

The suboptimal CCK demodulation apparatus using the multipliers 160A, 160B, 160C perform a demodulation by using a FFT apparatus having a butter fly structure without signal delay. That is, by using the FFT structure, three multipliers 160A, 160B, 160C can be effectively embodied. Also, the suboptimal demodulation can be performed by using single FFT apparatus without separately including the FFT module and the CCK demodulation module in the receiver employing 802.11g standard.

Figure 9:
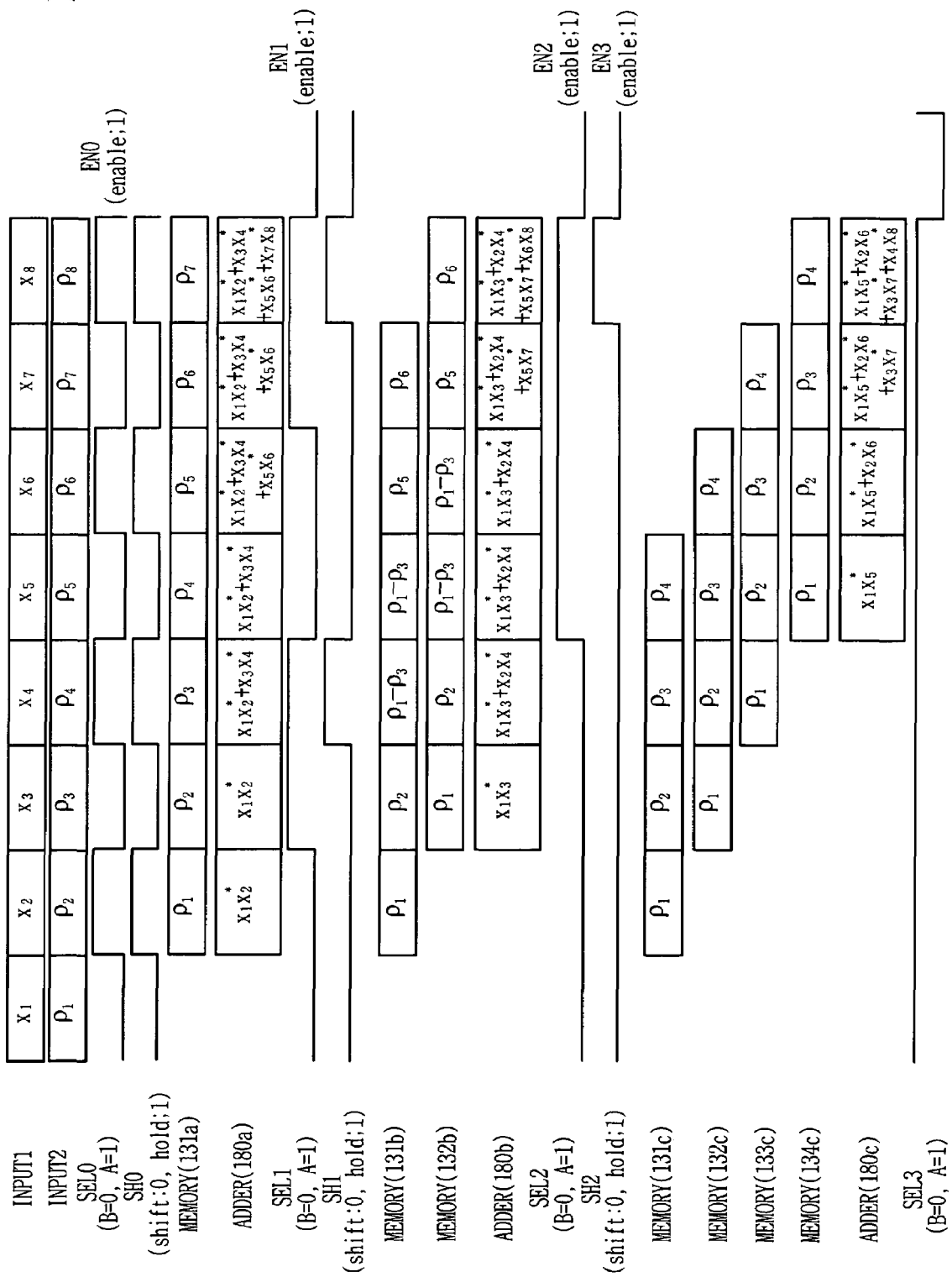
FIG. 9 is a graph showing a signal flow of the CCK demodulation apparatus shown in FIG. 8.

Such a suboptimal CCK demodulation apparatus can also be embodied without using a multiplier as described above. That is, FIG. 8 shows the suboptimal CCK demodulation apparatus without using a multiplier, and FIG. 9 shows a signal flow of the suboptimal CCK demodulation apparatus shown in FIG. 8.

As shown in FIG. 8, when a code length is $2^3$, a first signal processing unit of the suboptimal CCK demodulation apparatus includes: a complex number/phase converter 260A for converting an input signal (complex number) to a phase; a memory 131A for temporally storing and outputting the output signal of the multiplexer 110A; a phase/complex number converter 270A, an adder 180A, a memory 190A, a complex number/phase converter 200A for obtaining a soft decision value of $\phi_2$ phase by converting a complex number obtained through multiplying a conjugated value to an odd chip and an even chip and summing the multiplied values to a phase; a multiplexer 230A, a subtracter 140A, a demultiplexer 210A for multiplexing $\phi_2$ phase, subtracting a multiplexed signal from the output signal (phase) of the memory 131A, and demultiplexing the subtracted signal; a multiplexer 110A for selecting one of the demultiplexed a first signal (phase) and an input signal(phase); an adder 170A for adding a demultiplexed second signal with a complex number converted signal and a chip signal, and outputting the added value to an adder 170B of the second signal processing unit; a memory 250A for providing the last chip of received data to the adder 170A; and a multiplexer 120A for selecting one of an input signal (phase) and the output signal (phase) of the memory 131A.

The second signal processing unit of the suboptimal CCK demodulation apparatus includes: a complex number/phase converter 260A for converting an input signal (complex number) to a phase; a memory 131B for temporally storing and outputting the output signal of the multiplexer 110B; a memory 132B for temporally storing and outputting the output signal of the memory 131B; a phase/complex number converter 270B, an adder 180B, a memory 190B, a complex number/phase converter 200B for obtaining a soft decision value of $\phi_3$ phase by converting a phase, which is obtained by multiplying a conjugated value to an odd chip and an even chip and summing the multiplied values, to a phase; a multiplexer 230B, a subtracter 140B, a demultiplexer 210B for multiplexing $\phi_3$ phase, subtracting a multiplexed signal from the output signal (phase) of the memory 132B, and demultiplexing the subtracted signal; a multiplexer 110B for selecting one of the demultiplexed a first signal (phase) and an input signal, that is an output signal of the multiplexer 120A of the first signal processing unit; an adder 170B for adding a complex number signal generated by converting a demultiplexed second signal and a chip signal, and outputting the added value to an adder 170C of the third signal processing unit; and a multiplexer 120B for selecting one of the output signal of the multiplexer 120A and the output signal (phase) of the memory 132B.

The third signal processing unit of the suboptimal CCK demodulation apparatus includes: a memory 131C for temporally storing and outputting the output signal of the multiplexer 110C; a memory 132C for temporally storing and outputting the output signal of the memory 131C; a memory 133C for temporally storing and outputting the output signal of the memory 132C; a memory 134C for temporally storing and outputting the output signal of the memory 133C; a phase/complex number converter 270C, an adder 180C, a memory 190C, a complex number/phase converter 200C for obtaining a soft decision value of $\phi_4$ phase by converting a phase, which is obtained by multiplying a conjugated value to an odd chip and an even chip and summing the multiplied values, to a complex number; a multiplexer 230C, a subtracter 140C, a demultiplexer 210C for multiplexing $\phi_4$ phase, subtracting a multiplexed signal from the output signal (phase) of the memory 134C, and demultiplexing the subtracted signal; a multiplexer 110C for selecting one of the demultiplexed a first signal (phase) and an input signal, that is an output signal of the multiplexer 120B of the first signal processing unit; an adder 170C for adding a complex number signal generated by converting a demultiplexed second signal and a chip signal, and outputting the added value to an adder 170C of the third signal processing unit; and a multiplexer 120C for selecting one of the output signal of the multiplexer 120B and the output signal (phase) of the memory 134C.

As described above, the suboptimal CCK demodulation apparatus includes N signal processing units connected in serial or $2^N$ code length where N is positive integer. $N^{th}$ processing unit receives input signals from the multiplexers of the $(N-1)^{th}$ signal processing unit. Also, $N^{th}$ signal processing unit $2^{N-1}$ memories connected in serial. For example, $4^{th}$ signal processing unit includes 8 memories connected in serial.

In FIG. 8, an input signal is passed through the complex number/phase converter 260A. In FIG. 9, ρ of 'INPUT2' denotes a phase generated by converting a complex number input value 'INPUT1'.

The suboptimal CCK demodulation apparatus shown in FIG. 6 uses multipliers 160A, 160B, 160C. But, the suboptimal CCK demodulation apparatus shown in FIG. 8 uses three subtracters 140A, 140B, 140C. Also, the suboptimal CCK demodulation apparatus uses the phase/complex number converters 270A, 280A, 270B, 280B, 270C, 280C and does not include conjugates 220A, 220B, 220C.

Herein, the phase/complex number converters and the complex number/phase converters are embodied by using a lookup table, and single converter is shared by each units.

As shown in FIG. 9, the suboptimal CCK demodulation apparatus shown in FIG. 8 is operated identical to the suboptimal CCK demodulation apparatus shown in FIG. 6.

As described above, the second demodulation scheme can be embodied by using the FFT module as shown in FIGS. 6 and 8.

Before explaining the optimized demodulation scheme according to the present embodiment, a conventional optimized demodulation scheme will be explained.

The conventional optimized demodulation scheme is a method for demodulating data a CCK modulated signal by obtaining all correlations for 64 code words when a CCK modulated signal is received in a receiver and selecting one having large value among the obtained correlations. That is, operations to obtain the correlation are performed 64 times. FIG. 10 shows a conventional optimized demodulation apparatus.

As shown, a correlator includes four basic fast walsh blocks (BFWB) 300. One of BFWBs 300 receives 8 input signals $x_1, x_2, x_3, x_4, x_5, x_6, x_7, x_8$ and outputs 16 correlation values through adding operation blocks 302, 303, 304. Herein, $\phi_2$ is defined as one of 1, j, −1, −j and the defined value is passed through the BFWB 300. Accordingly, four BFWB are required for 1, j, −1, −j as shown in a block 305. Each of BFWBs 300 requires 28 complex number adding operations, and thus total 112 complex number adding operations are performed in the block 305. Total 64 correlation values are obtained from the block 305 and obtained 64 correlation values are compared to select the largest value. As a result, a code word of the largest correlation value becomes the received code word. To select the largest complex number correlation value, total 128 real number multiplying operations and 64 adding operations are performed. Additionally, 63 comparison operations are required to select the largest complex correlation value. Furthermore, a parallel processing is required for processing a signal since 8 chip signals are inputted for obtaining 64 correlation values. Also, 64 pyramid structures (not shown) is required since comparison operations are required to compare 64 correlation values. Such an operation sequence of the conventional optimized CCK demodulation scheme is not effective, and a complexity of hardware is very high.

Another conventional optimized CCK demodulation scheme obtains 16 correlation values from $x_1, x_2, x_3, x_4$, and obtains another 16 correlation values from $x_5, x_6, x_7, x_8$. After then, 64 correlation values are obtained from previously obtained correlation values. Also, the conventional optimized CCK demodulation scheme selects the largest one among the 64 correlation values as a code word. It also requires 63 comparison operations as shown in FIG. 10.

Hereinafter, the optimized CCK demodulation apparatus according to the present invention will be explained with reference to FIG. 11. The optimized CCK demodulation apparatus according to the present invention reduces the number of operations performed in the correlator and the comparator while having a same performance compared to conventional optimized CCK demodulation schemes.

Figure 11:
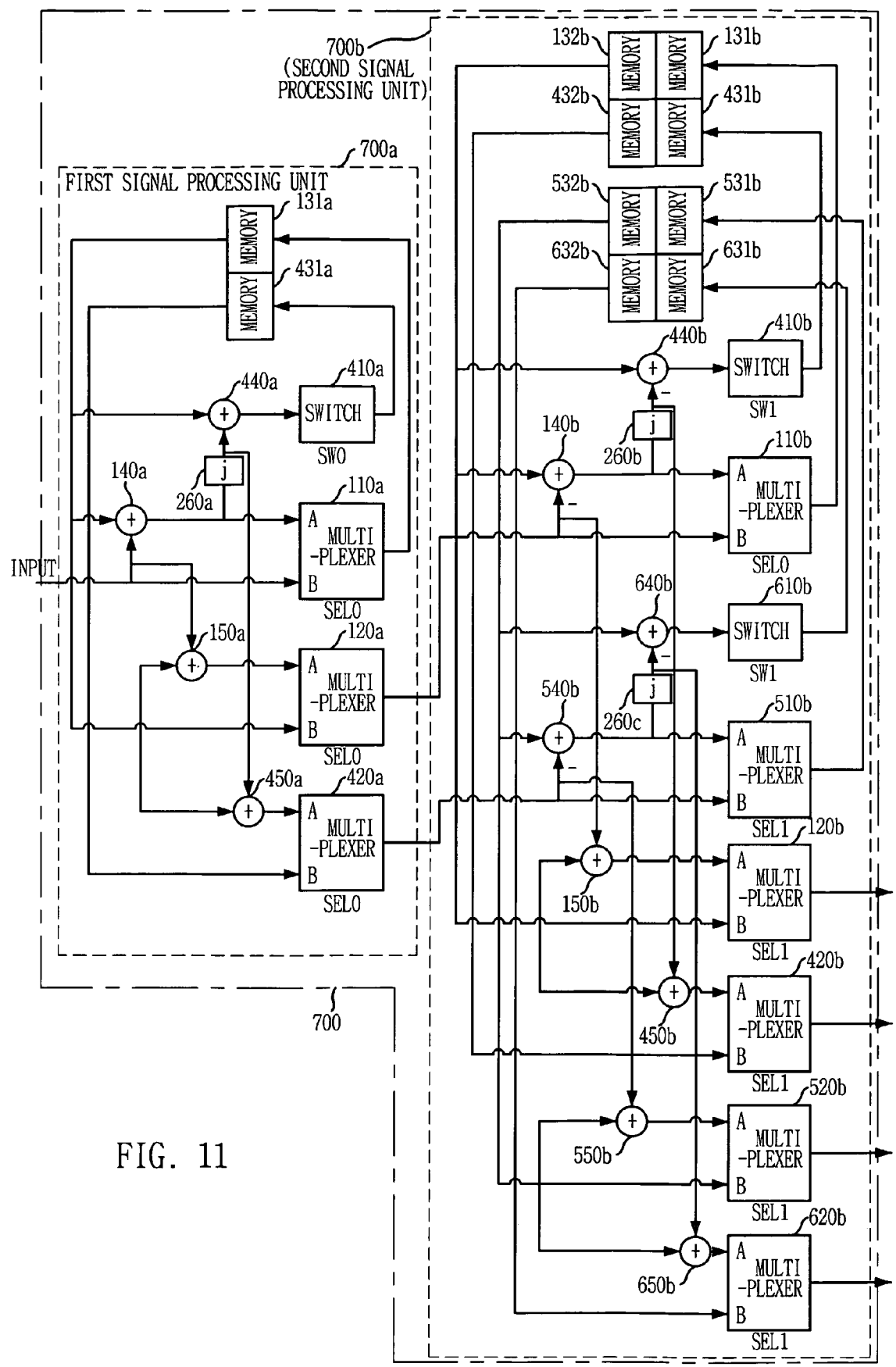
FIG. 11 is a block diagram of a correlator of a CCK demodulation apparatus in accordance with a preferred embodiment of the present invention.

As shown in FIG. 11, the correlator can be embodiment by using a butter fly structure of the FFT.

The correlator of FIG. 11 includes two butter fly structures.

A first butter fly structure of a first signal processing unit 700A includes: a multiplexer 110A, a memory 131A, a subtracter 140A, an adder 150A, and a multiplexer 120A.

A second butter fly structure of the first signal processing unit 700A includes: a subtracter 400A for subtracting the output signal of the memory 131A and an output signal of a 90° phase shifter 260A receiving an input of the first signal processing unit 700A; a switch 410A, a memory 431A, an adder 450A, and a multiplexer 420A.

Herein, the 90° phase shifter 260A processes a simple complex number a+jb as a+j⇒b+ja.

Meanwhile, a second signal processing unit 700B has same structure of the first signal processing unit 700A with twice size of two memories connected in parallel.

A first parallel structure of the second signal processing unit 700B includes four memories 131B, 132B, 431B, 432B, and the second parallel structure includes four memories 531B, 532B, 631B, 632B.

A first parallel structure of the second signal processing unit 700B includes two butter fly structures.

Herein, in the first parallel structure of the second signal processing unit 700B, the first butter fly structure includes a multiplexer 110B, memories 131B, 132B, a subtracter 140B, an adder 150B and a multiplexer 120B.

Also, in the first parallel structure of the second signal processing unit 700B, a second butter fly structure includes a subtracter 400B for subtracting the output signal of the memory 132B and an output signal of a 90° phase shifter 260B receiving an output signal of the multiplexer 120A of the first signal processing unit 700A; a switch 410B, memories 431B, 432B, an adder 450B, and a multiplexer 420B.

In the second parallel structure in the second signal processing unit 700B, there are also two butter fly structures included.

In the second parallel structure of the second signal processing unit 700B, a first butter fly structure includes a multiplexer 510B, memories 531B, 532B, a subtracter 540B, an adder 550B and a multiplexer 520B.

Also, in the second parallel structure of the second signal processing unit 700B, a second butter fly structure includes a subtracter 640B for subtracting the output signal of the memory 532B and an output signal of a 90° phase shifter 260C shifting an output signal of the multiplexer 420A of the first signal processing unit 700A, a switch 610B, memories 631B, 632B, an adder 650B, and a multiplexer 620B.

Figure 12A:
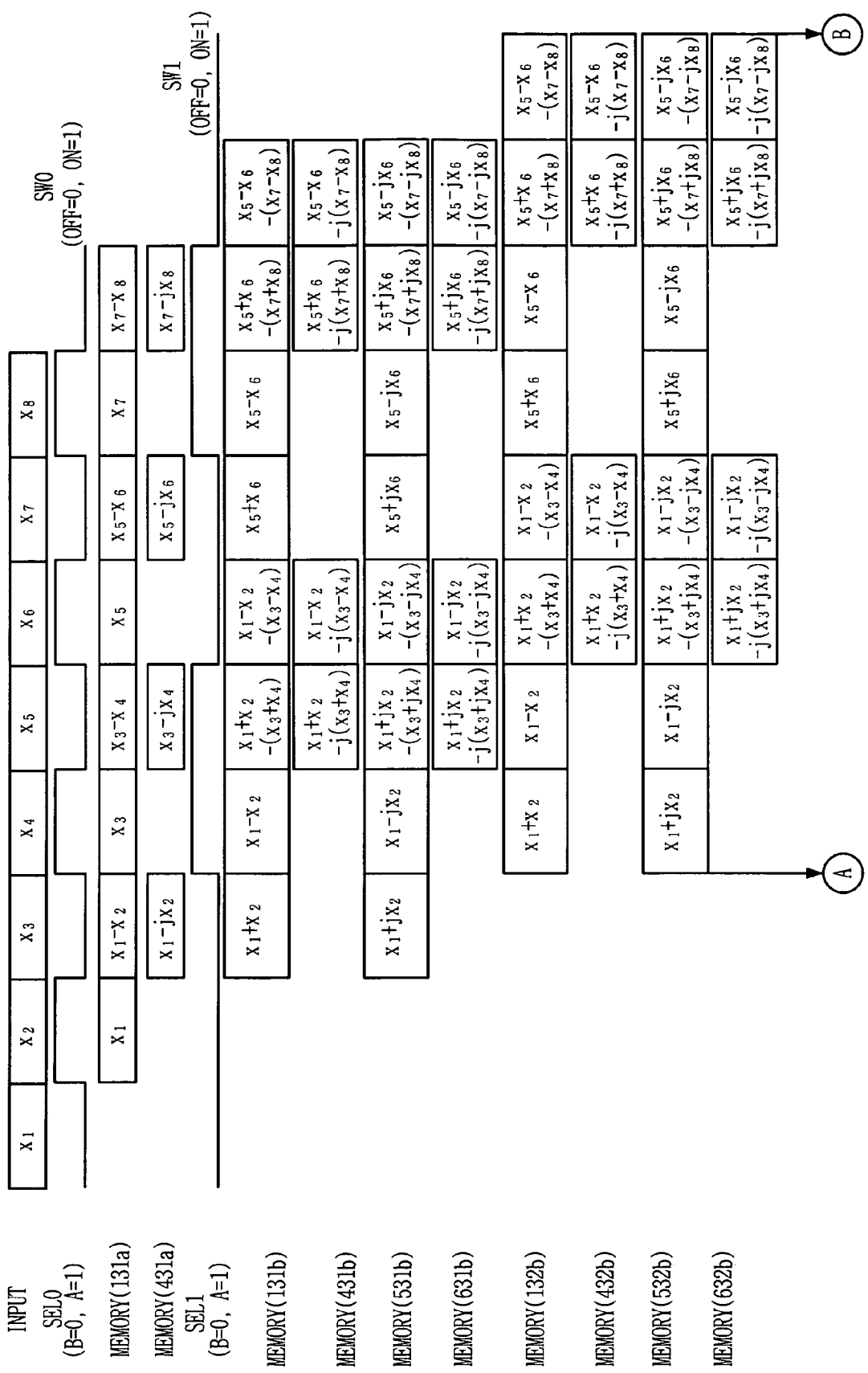

The correlator having total 6 butter fly structures has a signal flow shown in FIG. 12A and 12B.

The correlator shown in FIG. 11 obtains 16 correlation values from $x_1, x_2, x_3, x_4$ among inputted 8 chips, and outputs 4 of 16 correlation values in parallel as shown as 801, 802, 803, 804 in FIG. 12B. And then, the correlator obtains 16 correlation values from $x_5, x_6, x_7$, x8 among inputted 8 chips, and outputs 4 of 16 correlation values in parallel as shown as 805, 806, 807, 808 in FIG. 12B.

As shown in FIG. 12A and 12B, the correlator according to the present embodiment can be used to obtain 16 correlation values in the adding operation block 304 from four values of the adding operation block 302. Also, the correlator according to the present embodiment can be used to obtain 16 correlation values from $x_1, x_2, x_3, x_4$, and to obtain 16 correlation values from $x_5, x_6, x_7, x_8$, and to obtain 64 correlation values from each of obtained 16 correlation values.

A demodulator reducing operation amount by using the correlator shown in FIG. 11 while having an identical performance compared to the conventional optimized demodulator is shown in FIG. 13.

FIG. 13 is a block diagram illustrating a CCK demodulation apparatus using a FFT device in accordance with another embodiment of the present invention.

Referring to FIG. 13, the CCK demodulation apparatus according to the present embodiment includes a correlator 900 shown in FIG. 11, and memory blocks 901 and 902 for storing correlation values outputted as 4 in parallel. Blocks 903 to 908 process 4 parallel signals.

Figure 14:
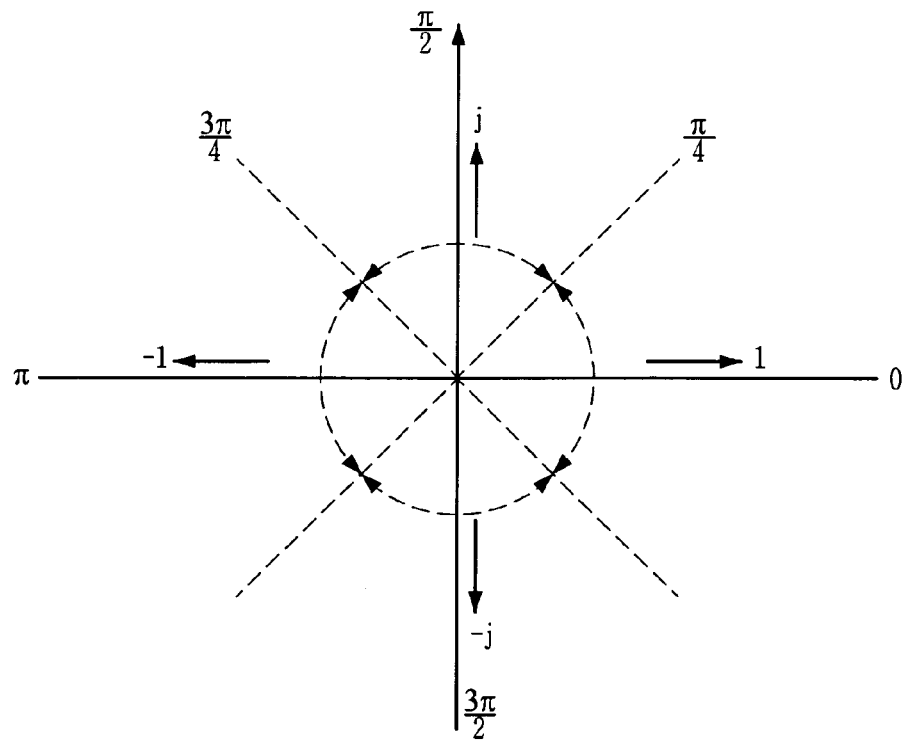
FIG. 14 is a graph for explaining detailed operations of a Hard decision block using in FIG. 13 according to the present invention.

Herein, blocks 903, 904 convert values outputted from the blocks 901 and 902 to phase values. The block 905 performs quantization on difference value between the output of the block 903 and the output of the block 904 as shown in FIG. 14. The quantized value outputted the block 905 is one of 1, j, −1, −j as shown in FIG. 14. The block 906 performs simple operations. For example, if the quantized value outputted from the block 905 is j, a complex number a+jb is processed as a+jb⇒b+ja. Also, a size of the block 907 is calculated by adding an output of the block 901 and the output of the block 906. The block 908 stores largest value among four values, and compares the stored largest value to next output four values. A larger value among the next output four values is compared to the stored largest value, and the larger value is stored in the block 908.

If signal processing speed from the block 903 to the block 908 is a speed that can be cooperated with an input signal of the block 900 of FIG. 13, the outputs 805 to 808 of the block 900 directly input to block 904 and the block 906 without using the block 902.

The optimized CCK demodulation apparatus according to the present invention is configured as the butter fly structure. The optimized CCK demodulation apparatus includes: a correlator 900 for obtaining 16 first correlation values from a first to a fourth chip signals $x_1$, $x_2$, $x_3$, $x_4$ from 8 chip signals, outputting each 4 of first correlation values in parallel, and obtaining 16 second correlation values from a fifth to a eighth chip signals $x_5$, $x_6$, $x_7$, $x_8$ and outputting each 4 of second correlation value; a first and a second memory 901, 902 for storing 16 of the first and the second correlation values outputted from the correlator 900, and outputting 4 correlation value in each time; a first and a second complex number/ phase converter 903, 904 for converting four parallel signals (complex numbers) outputted from the first and the second memory 901, 902 to phase values; a subtracter and a quantization unit 905 for calculating a difference between the first and the second complex number/phase converter 903, 904, and performing a quantization on the difference; a phase rotation converter 906 for converting phases of 4 parallel signals outputted from the second memory 902 according to a quantized value of the quantization unit 905; an adder and an absolute value calculator 907 for adding 4 parallel signals outputted from the first memory 901 and the output signal of the phase rotation transformer 906; a comparator 908 for storing the largest value among four values having a decided signal size, comparing the stored largest value to a largest value among next input four values, and storing a larger value.

Hereinafter, a reason why the optimized CCK demodulation scheme according to the present invention reduces operating amount while having identical performance compared to the conventional optimized CCK demodulation schemes will be explained.

Figure 15:
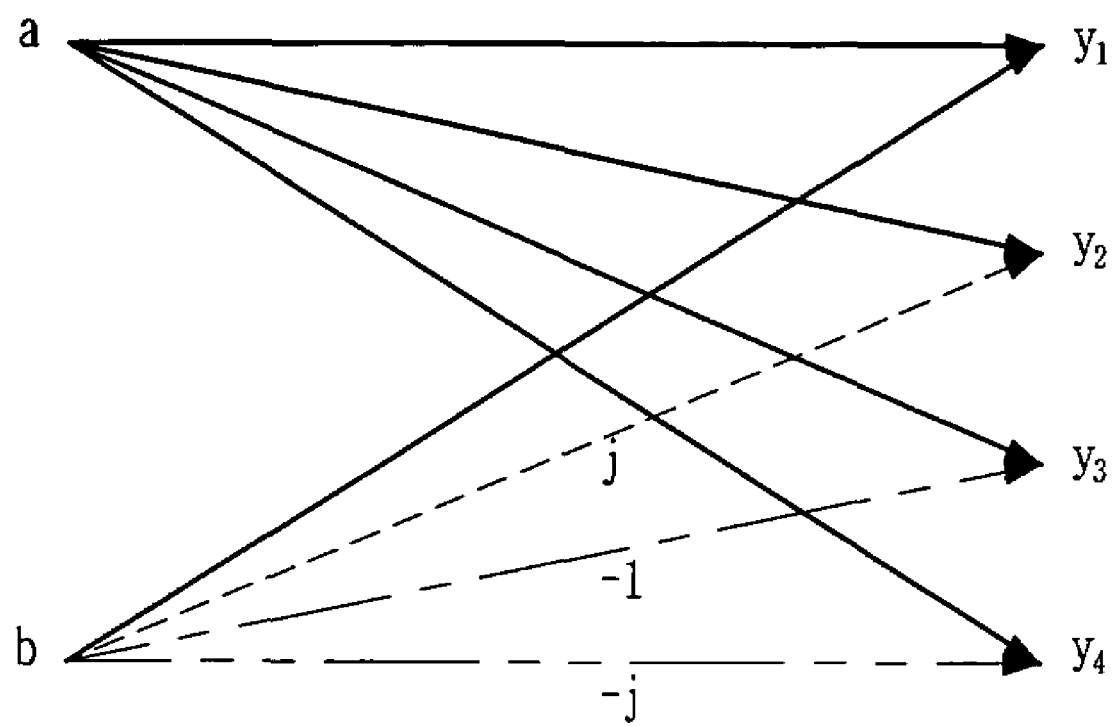
FIG. 15 is a view for explaining a butter fly structure used in a correlator in FIG. 13 according to the present invention.

The butter fly structure used to obtain a code word through the correlation values shown in FIG. 15 fixes a phase of a signal A, and adding the phase of the signal A to a phase of signal B by shifting the phase of signal B from 1 (0°), j (90°), −1 (180°), to −j (270°). After adding, they are compared each others and the largest value is selected as a received signal. In other word, when the signal B is rotated from 1, j, −1, to −j, the largest value among outputs $y_1$, $y_2$, $y_3$, $y_4$ of FIG. 15 is outputted when the phase of signal A has least phase difference compared to rotated B value. For example, a phase difference between the signal A and the signal B is 100°, the butter fly structure shown in FIG. 15 can estimate that a $y_2$ value (a+jb) will be the largest phase difference value without calculating each size of $y_1$, $y_2$, $y_3$, $y_4$. Accordingly, the blocks 901 and 902 can obtain the largest value by obtaining only 16 correlation values without obtaining 64 correlation values.

Hereinafter, complexities between the conventional demodulation scheme and the demodulation scheme according to the present invention will be compared.

The conventional demodulation scheme performs 112 complex number adding operations for obtaining 64 correlation values and 64 real number adding operations for obtaining a size. Also, 128 real number multiplying operations are performed for obtaining sizes of 64 correlation values. Additionally, 63 comparison operations are performed.

However, the demodulation scheme according to the present invention performs 48 complex number adding operations for obtaining the correlation values, 16 real number subtracting operations for obtaining differences between the block 903 and the block 904, and 16 complex number adding operations for adding the output of the 901 block and the output of the block 906. Also, 32 real number multiplying operations are performed for obtaining a size in the block 907. Furthermore, 32 real number multiplying operations are performed in the block 907 for obtaining 16 correlation values, and the complex number of phase values are obtained 32 times in the block 903 and the block 904 by using a lookup table. In the block 906, hard decision is performed 16 times.

The complexities of the conventional demodulation scheme and the optimized CCK demodulation scheme according to the present invention are shown in below table 1.

TABLE 1

|  | Conventional demodulation scheme | Optimized CCK demodulation scheme according to the present invention |
|---|---|---|
| Number of adding real numbers | 288 | 160 |
| Number of multiplying real numbers | 128 | 32 |
| Number of comparisons | 63 | 31 |
| Number of converting phase value to complex number | 0 | 32 |
| Number of hard decisions | 0 | 16 |

As shown in Table 1, the complexity of the optimized CCK demodulation scheme according to the present invention is reduced about ½ in adding operation, about ¼ in multiplying operation, and about ½ in comparison operation. Hard decisions can simply and quickly obtain a result and the converting operation for converting a complex number to a phase value can be quickly performed by using a lookup table.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

As described above, a transmitting/receiving device according to the present invention can perform CCK modulation/demodulation by using a module selectively performing FHT and FFT.

That is, IEEE of WLAN standard 802.11g includes OFDM scheme based on 802.11a and CCK modulation scheme based on 802.11b. Until now, a transmitting/receiving device employing the WLAN standard 802.11g includes two separate receivers for OFDM and CCK modulation. However, in the present invention, OFDM module and CCK module are integrated as one module having lower complexity compared to conventional scheme by embodying the CCK modulation using FFT structure in the OFDM module, and embodying the suboptimal and the optimized CCK modulations using FFT structure in OFDM module. Furthermore, according to the present invention, CDMA, OFDM, CCK modules may be integrated as single module.

The present invention contains subject matter related to Korean patent application No. KR 2004-0078477, filed in the Korean patent office on Feb. 10, 2004, the entire contents of which being incorporated herein by reference.

The present application contains subject matter related to Korean patent application No. 2004-0105824, filed with the Korean Intellectual Property Office on Dec. 14, 2004, the entire contents of which is incorporated herein by reference.

While the present invention has been described with respect to certain preferred embodiments, it will be apparent to those skilled in the art that various changes and modifications may be made without departing from the spirit and scope of the invention as defined in the following claims.

What is claimed is:

1. An Fast Fourier Transform (FFT) apparatus selectively performing a Fast Hadamard Transform (HFT), comprising N signal processing means connected in serial according to a $2^N$ length of a code, where N is a positive integer, wherein each of N signal processing means includes:
   a storing means for temporally storing and outputting an output signal of a first multiplexing means;
   an adding means for adding the output signal of the storing means and an input signal;
   a subtracting means for subtracting the input signal from the output signal of the storing means;
   a multiplying means for multiplying a phase coefficient to the output signal of the subtracting means and outputting the multiplied signal;
   a first multiplexing means for selecting one of the output signal of the multiplying means and the input signal; and
   a second multiplexing means for selecting one of the output signal of the adding means and the output signal of the storing means,
   wherein $2^{nd}$ to $N^{th}$ signal processing means receive an output signal of a second multiplexing means of $(N-1)^{th}$ signal processing means and $N^{th}$ signal processing means includes $2^{N-1}$ storing means connected in serial.

2. The FFT apparatus as recited in claim 1, wherein each of the signal processing means performs a Fast Hadamard Transform (FHT) by bypassing the output signal of the subtracting means to the first multiplexing means without using the multiplying means.

3. The FFT apparatus selectively performing FHT as recited in claim 1, wherein when the length of the code is $2^2$, the FFT apparatus includes:
   a first storing means for temporally storing and outputting an output signal of a first multiplexing means;
   a first adding means for adding the output signal of the first storing means and an input signal and outputting the adding result;
   a first subtracting means for subtracting the input signal from the output signal of the first storing means and outputting the subtracting result;
   a first multiplying means for multiplying a first phase coefficient ($W_o$) to the output signal of the first subtracting means and outputting the multiplying result;
   a first multiplexing means for selecting one of the output signal of the first multiplying means and the input signal and outputting the selected signal;
   a second multiplexing means for selecting one of the output signal of the first subtracting means and the output signal of the first storing means;
   a second storing means for temporally storing and outputting an output signal of the third multiplexing means;
   a third storing means for temporally storing and outputting an output signal of the second storing means;
   a second adding means for adding the output signal of the third storing means and the second multiplexing means and outputting the adding result;
   a second subtracting means for subtracting the output signal of the second multiplexing means from the output signal of the third storing means and outputting the subtracting result;
   a second multiplying means for multiplying a second phase coefficient ($W_o$) to the output signal of the second subtracting means and outputting the multiplying result;
   a third multiplexing means for selecting one of the output signal of the second multiplying means and the output signal of the second multiplexing means and outputting the selected signal; and
   a fourth multiplexing means for selecting one of the output signal of the second subtracting means and the output signal of the third storing means.

4. The FFT apparatus selectively performing the FHT as recited in claim 3, wherein phase values of below Eq. 1 are obtained by a walsh transform of below Eq. 2 for a complementary code keying modulation, $$C = (e^{j(\phi_1+\phi_2+\phi_3+\phi_4)}, e^{j(\phi_1+\phi_3+\phi_4)}, e^{j(\phi_1+\phi_2+\phi_4)}, \quad \text{Eq. 1}$$
$$-e^{j(\phi_1+\phi_4)}, e^{j(\phi_1+\phi_2+\phi_3)}, e^{j(\phi_1+\phi_3)}, -e^{j(\phi_1+\phi_2)}, e^{j(\phi_1)})$$

$$\Phi = \begin{bmatrix} \phi_1+\phi_2+\phi_3+\phi_4 \\ \phi_1+\phi_3+\phi_4 \\ \phi_1+\phi_2+\phi_4 \\ \phi_1+\phi_4 \\ \phi_1+\phi_2+\phi_3 \\ \phi_1+\phi_3 \\ \phi_1+\phi_2 \\ \phi_1 \end{bmatrix} \quad \text{Eq. 2}$$

$$= \begin{bmatrix} 1 & 1 & 1 & 1 & 1 & 1 & 1 & 1 \\ 1 & 0 & 1 & 0 & 1 & 0 & 1 & 0 \\ 1 & 1 & 0 & 0 & 1 & 1 & 0 & 0 \\ 1 & 0 & 0 & 1 & 1 & 0 & 0 & 1 \\ 1 & 1 & 1 & 1 & 0 & 0 & 0 & 0 \\ 1 & 0 & 1 & 0 & 0 & 1 & 0 & 1 \\ 1 & 1 & 0 & 0 & 0 & 0 & 1 & 1 \\ 1 & 0 & 0 & 1 & 0 & 1 & 1 & 0 \end{bmatrix} \begin{bmatrix} \phi_1 \\ \phi_2 \\ \phi_3 \\ 0 \\ \phi_4 \\ 0 \\ 0 \\ 0 \end{bmatrix} = T\Theta.$$

5. The FFT apparatus selectively performing FHT as recited in claim 4, wherein the FFT apparatus modulates and demodulates data by using a FFT module since a reverse transform of a walsh code matrix is shown as a hadamard code in below Eq. 3 and Eq. 4 as:

$$T^{-1} = 2(H_3 + h_{31}h_{31}^T)^{-1} \quad \text{Eq. 3}$$
$$= 2(H_3^{-1} - H_3^{-1}h_{31}(1+h_{31}^T H_3^{-1} h_{31})^{-1} h_{31}^T H_3^{-1})$$
$$= 2\left(\frac{1}{8}H_3 - \frac{1}{8}H_3 h_{31}\left(h_{31}^T\left(1+h_{31}^T\frac{1}{8}H_3 h_{31}\right)^{-1} h_{31}^T \frac{1}{8}H_3\right)\right)$$
$$= \frac{1}{4}H_3 - \begin{bmatrix} 1 \\ 0 \\ 0 \\ 0 \\ 0 \\ 0 \\ 0 \\ 0 \end{bmatrix} \cdot [1\ 0\ 0\ 0\ 0\ 0\ 0\ 0],$$

-continued $$\Theta = \left( \frac{1}{4} H_3 - \begin{bmatrix} 1 \\ 0 \\ 0 \\ 0 \\ 0 \\ 0 \\ 0 \\ 0 \end{bmatrix} [1\ 0\ 0\ 0\ 0\ 0\ 0\ 0] \right) \Phi \qquad \text{Eq. 4}$$

$$= \frac{1}{4} \begin{bmatrix} 8\phi_1 + 4\phi_2 + 4\phi_3 + 4\phi_4 \\ 4\phi_2 \\ 4\phi_3 \\ 0 \\ 4\phi_4 \\ 0 \\ 0 \\ 0 \end{bmatrix} - \begin{bmatrix} \phi_1 + \phi_2 + \phi_3 + \phi_4 \\ 0 \\ 0 \\ 0 \\ 0 \\ 0 \\ 0 \\ 0 \end{bmatrix}.$$

6. A complementary code keying (CCK) modulation apparatus having a Fast Fourier Transform (FFT), comprising N signal processing means connected in serial according to a $2^N$ length of a code, where N is a positive integer, Wherein each of N signal processing means includes:

a storing means for temporally storing and outputting an output signal of a first multiplexing means;

an adding means for adding the output signal of the storing means and an input signal;

a first multiplexing means for selecting one of the output signal of the first storing means and the input signal; and a second multiplexing means for selecting one of the output signal of the first adding means and the output signal of the first storing means; and a second multiplexing means for selecting one of the output signal of the first adding means and the output signal of the storing means, wherein $2^{nd}$ to $N^{th}$ signal processing means receive an output signal of a second multiplexing means of $(N-1)^{th}$ signal processing means and $N^{th}$ signal processing means includes $2^{N-1}$ storing means connected in serial.

7. The CCK modulation apparatus as recited in claim 6, wherein when the length of the code is $2^3$, the CCK modulation apparatus includes:

a first storing means for temporally storing and outputting an output signal of a first multiplexing means;

a first adding means for adding the output signal of the first storing means and an input signal and outputting the adding result;

a first multiplexing means for selecting one of the output signal of the first storing means and the input signal;

a second multiplexing means for selecting one of the output signal of the adding means and the output signal of the first storing means;

a second and a third storing means for temporally storing and outputting the output signal of a third multiplexing means;

a second adding means for adding the output signal of the third storing means and the output signal of the second multiplexing means and outputting the adding result;

the third multiplexing means for selecting one of the output signal of the third storing means and the output signal of the second multiplexing means;

a fourth multiplexing means for selecting one of the output signal of the second adding means and the output signal of the third storing means;

a fourth storing means for temporally storing and outputting an output signal of a fifth multiplexing means;

a fifth storing means for temporally storing and outputting the output signal of the fourth multiplexing means;

a sixth storing means for temporally storing and outputting the output signal of the fifth multiplexing means;

a seventh storing means for temporally storing and outputting the output signal of the sixth storing means;

a third adding means for adding the output signal of the seventh storing means and the output signal of the fourth multiplexing means and outputting the adding result;

the third multiplexing means for selecting one of the output signal of the seventh storing means and the output signal of the fourth multiplexing means; and a sixth multiplexing means for selecting one of the output signal of the third adding means and the output signal of the seventh storing means.

8. The CCK modulation apparatus as recited in claim 6, wherein the CCK modulation apparatus supports orthogonal frequency division multiple (OFDM) and CCK in IEEE 802.11g at the same time by using CCK modulation module using the FFT structure.

9. A complementary code keying (CCK) demodulation apparatus comprising N signal processing means connected in serial according to a $2^N$ length of a code, where N is a positive integer, wherein each of N signal processing means includes:

a first storing means for temporally storing and outputting an output signal of a first multiplexing means;

a first symbol detecting means for converting a sum of values, generated by multiplying a conjugated value to an odd chip and an even chip, and obtaining a soft decision value of a first predetermined phase;

a second symbol detecting means for multiplexing the first predetermined phase, conjugating the multiplexed signal, multiplying the conjugated signal to the output signal of the first storing means, and demultiplexing the multiplied signal;

a first multiplexing means for selecting one of a first signal, which is demultiplexed by the second symbol detecting means, and an input signal;

an adding means for adding a second signal, which is demultiplexed by the second symbol detecting means, and a chip signal or adding the second signal and an output signal of an adding means of a previous signal processing means, and outputting the adding signal;

a second storing means for providing a last received chip to the adding means in a first signal processing means;

a complex number/phase converting means for converting the output signal (complex number) of the adding means to a phase, and outputting a second predetermined phase; and a second multiplexing means for selecting one of the input signal and the output signal of the first storing means, wherein $2^{nd}$ to $N^{th}$ signal processing means receive an output signal of a second multiplexing means of $(N-1)^{th}$ signal processing means and $N^{th}$ signal processing means includes $2^{N-1}$ first storing means connected in serial.

10. The CCK demodulation apparatus as recited in claim 9, wherein a converter in the first symbol detecting means and the complex number/phase converting means is embedded as a lookup table, and the CCK demodulation apparatus supports orthogonal frequency division multiple (OFDM) and CCK in IEEE 802.11g at the same time by using CCK demodulation module using the FFT structure.

11. A complementary code keying demodulation apparatus, comprising N signal processing means connected in serial according to a $2^N$ length of a code, where N is a positive integer,
wherein each of N signal processing means includes:
a first storing means for temporally storing and outputting an output signal (phase) of a first multiplexing means;
a first symbol detecting means for converting a sum of values, generated by multiplying a conjugated value to an odd chip and an even chip, and obtaining a soft decision value of a first predetermined phase;
a second symbol detecting means for multiplexing the first predetermined phase, subtracting the multiplexed signal from the output signal (phase) of the first storing means, and demultiplexing the subtracted signal;
a first multiplexing means for selecting one of a first signal (phase), which is demultiplexed by the second symbol detecting means, and an input signal (phase);
an adding means for adding a second signal (phase), which is demultiplexed by the second symbol detecting means, and a chip signal or adding the second signal and an output signal (complex number) of an adding means of a previous signal processing means, and outputting the adding signal;
a second storing means for providing a last received chip to the adding means in a first signal processing means;
a second complex number/phase converting means for converting the output signal (complex number) of the adding means to a phase, and outputting a second predetermined phase in a last signal processing means; and
a second multiplexing means for selecting one of the input signal (phase) and the output signal (phase) of the first storing means,
wherein $2^{nd}$ to $N^{th}$ signal processing means receive an output signal of a second multiplexing means of $(N-1)^{th}$ signal processing means and $N^{th}$ signal processing means includes $2^{N-1}$ first storing means connected in serial.

12. The CCK demodulation apparatus, wherein a converter converting a complex number to a phase in the first symbol detecting means and the first and the second complex number/phase converting means, and a converter converting a phase to a complex number in the first and the second symbol detecting means are embedded as a lookup table, and the CCK demodulation apparatus supports orthogonal frequency division multiple (OFDM) and CCK in IEEE 802.11g at the same time by using CCK demodulation module using the FFT structure.

13. A complementary code keying (CCK) demodulation apparatus, comprising:
a correlation means configured as a butter fly structure for outputting 16 first correlation values obtained from a first to a fourth chip signals among 8 chip signals in a set of 4 in parallel, and outputting 16 second correlation values obtained from a fifth to a eighth chip signals among 8 chip signals in a set of 4 in parallel;
a first and a second storing means for storing 16 of the first correlation values and 16 of the second correlation values outputted from the correlation means;
a first and second complex number/phase converting means for converting 4 parallel signals (complex number) outputted from the first and the second storing means to a phase value;
a quantization means for calculating a difference between the first and the second complex number/phase converting means and quantizing the difference;
a phase converting means for converting a phase of 4 parallel signals outputted from the second storing means according to the quantization value of the quantizing means;
an absolute value calculating means for calculating a size of a signal by subtracting 4 parallel signals outputted from the first storing means and the output signal of the phase converting means; and
a comparing and storing means for storing a largest value among four value having a decided value, comparing the largest value with four next input signals, and storing the largest value.

14. The CCK demodulation apparatus as recited in claim 13, wherein the correlation means is configured with 6 butter fly structures, a first signal processing means includes two butter fly structures in parallel, a second signal processing means includes four butter fly structures in parallel, and the correlation means outputs 32 correlation values for inputted 8 chips and a set of 4 correlations values is outputted 8 time.

15. The CCK demodulation apparatus as recited in claim 14, wherein the correlation means is used as a basic fast walsh block (BFWB) in a general correlator, and 16 correlation values are obtained from chip signals $x_1, x_2, x_3, x_4$, another 16 correlation values are obtained from chip signals $x_5, x_6, x_7, x_8$, and 64 correlation values are obtained from the two set of 16 obtained correlation values.

16. The CCK demodulation apparatus as recited in claim 13, when a speed of processing signal between the first and the second complex number/phase converting means, the quantization means, the phase converting means, the absolute calculating means, and the comparing and storing means is a suitable speed of cooperating with the input signal of the correlator, the output of the correlation means directly inputs to the complex number/phase converting means and the phase converting means.

17. The CCK demodulation apparatus as recited in claim 16, wherein the phase converting means process a complex number a+jb as a+jb⇒b+ja when one of the output values 1, j, −1, −j from the quantizing means is j, and process a complex number a+jb as a+jb⇒b−ja when one of the output values 1, j, −1, −j from the quantizing means is −j.

18. The CCK demodulation apparatus as recited in claim 17, wherein the complex number/phase converting means is embodied by a lookup table.

* * * * *